United States Patent
Chen et al.

(10) Patent No.: US 6,730,242 B2
(45) Date of Patent: May 4, 2004

(54) GLASS-FORMING LIQUID CRYSTALLINE COMPOSITIONS AND OPTICAL DEVICES FORMED THEREFROM

(75) Inventors: Shaw H. Chen, Penfield, NY (US); Fred Y. Fan, Rochester, NY (US)

(73) Assignee: The University of Rochester, Rochester, NY (US)

( * ) Notice: Subject to any disclaimer, the term of this patent is extended or adjusted under 35 U.S.C. 154(b) by 0 days.

(21) Appl. No.: 10/387,184

(22) Filed: Mar. 12, 2003

(65) Prior Publication Data

US 2003/0164473 A1 Sep. 4, 2003

Related U.S. Application Data

(62) Division of application No. 09/740,500, filed on Dec. 19, 2000, now Pat. No. 6,558,572.
(60) Provisional application No. 60/171,798, filed on Dec. 22, 1999.

(51) Int. Cl.$^7$ .............................................. C09K 19/52
(52) U.S. Cl. ........................... 252/299.01; 252/299.61; 252/299.62; 252/299.66; 252/299.67; 560/8
(58) Field of Search ..................... 560/8; 252/299.01, 252/299.61, 299.62, 299.66, 299.67; 359/103, 106

(56) References Cited

U.S. PATENT DOCUMENTS

| | | |
|---|---|---|
| 5,332,522 A | 7/1994 | Chen et al. |
| 5,378,393 A | 1/1995 | Chen et al. |
| 5,417,882 A | 5/1995 | Bach et al. |
| 5,514,296 A | 5/1996 | Chen et al. |
| 6,248,259 B1 | 6/2001 | Izumi et al. |

OTHER PUBLICATIONS

Collings, P.J. et al., Handbook of Liquid Crystal Research, Oxford University Press, New York (1997).

Wedler, W. et al., "Vitrification in Low–Molecular–Weight Mesogenic Compounds", J. Mater. Chem. vol. 1, No. 3, 347–356 (1991).

Attard, G.S. et al., "Low Molar Mass Liquid–Crystalline Glasses: Preparation and Properties of the α–(4–Cyanobiphenyl–4'–oxy)– – (1–pyreniminebenzylidene–4'–oxy)alkanes", Chem. Mater., vol. 4, No. 6, 1246–1253 (1992).

Neumann, B. et al., "Liquid Crystalline Macrocycles: Novel Glass–Forming Nematic Materials That Can Undergo Charge Transfer Induced Phase Transitions", Adv. Mater., vol. 9, No. 3, 241–244 (1997).

Gresham, K.D. et al., "Phase Behavior of Cyclic Siloxane–Based Liquid Crystalline Compounds", Journal of Polymer Science: Part A: Polymer Chemistry, vol. 32, 2039–2047 (1994).

Ortler, R. et al., "Reversible Holographic–Optical Data Storage in Cholesteric Liquid–Crystalline Siloxanes", Makromol. Chem., Rapid Commun., vol. 10, 189–194 (1989).

Tamaoki, N. et al., "Rewritable Full–Color Recording on a Thin Solid Film of a Cholesteric Low–Molecular–Weight Compound", Adv. Mater., vol. 9, No. 14, 1102–1104 (1997).

Wang, H. et al., "Thermally Stable Nonlinear Optical Activity in a Smetic–A Liquid Crystal", Nature, vol. 384, No. 21, 244–247 (1996).

Loddoch, M. et al., "Novel Glass–Forming Ferroelectric Liquid–Crystal Material of High Second–Order Nonlinearity", Appl. Phys. B 59, 591–595 (1994).

Natarajan, L. V. et al., "Novel Photochromic Cholesteric Liquid Crystal Siloxane", Macromolecules, vol. 24, No. 24, 6554–6556 (1991).

Morita, Y. et al., "Active Liquid Crystal Devices Incorporating Liquid Crystal Polymer Thin Film Waveplates", Jpn. J. Appl. Phys. vol. 38, Pt. 1, No. 1A, 95–100 (1999).

Van De Witte, P. et al., "Optical Components From a New Vitrifying Liquid Crystal", Liquid Crystals, vol. 26, No. 7, 1039–1046 (1999).

Chen, S. H. et al., "Novel Vitrifiable Liquid Crystals as Optical Materials", Adv. Mater., vol. 8, No. 12, 998–1001 (1996).

Chen, S. H. et al., "Novel Glass–Forming Organic Materials. 1. Adamantane with Pendant Cholesteryl, Disperse Red 1, and Nematogenic Groups", Macromolecules, vol. 28, No. 23, 7775–7778 (1995).

Chen, S. H. et al., "Novel Glass–Forming Organic Materials. 3. Cubane with Pendant Nematogens, Carbazole, and Disperse Red 1", Macromolecules, vol. 30, No. 1, 93–97 (1997).

Chen, S. H. et al., "Novel Glass–Forming Liquid Crystals. IV. Effects of Central Core and Pendant Group on Vitrification and Morphological Stability", Liquid Crystals, vol. 21, No. 5, 683–694 (1996).

Shi, H. et al., "Dynamic Mechanical Properties of Cyclohexane–Based Glass–Forming Liquid Crystals and a Linear Side Chain Polymer Analogue", Liquid Crystals, vol. 20, No. 3, 277–282 (1996).

(List continued on next page.)

Primary Examiner—Mark F. Huff
Assistant Examiner—Jennifer R. Sadula
(74) Attorney, Agent, or Firm—Kenneth J. Lukacher

(57) ABSTRACT

A glass-forming liquid crystal composition comprises a compound having a molecular weight in the range of about 1000 to 5000 grams per mole and having the formula

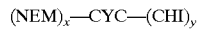

$(NEM)_x$—CYC—$(CHI)_y$ wherein CYC is a substituted cycloaliphatic core moiety containing about 24 to about 60 carbon atoms or a substituted aromatic core moiety containing about 6 to about 36 carbon atoms, NEM is a nematogenic pendant moiety, CHI is a chiral pendant moiety, x is 3 to 9, and y is 0 to 4. An optical device is formed from the liquid crystal composition.

18 Claims, 14 Drawing Sheets

OTHER PUBLICATIONS

Shi, H. et al., "Dynamics of Defect Annihilation in Vitrified Liquid Crystalline (VLC) Thin Films Upon Thermal Annealing", Mat. Res. Soc. Symp. Proc., vol. 425, 27–32 (1996).

Shi, H. et al., "Effects of Stereochemistry, Mesogenic Core and Spacer Length on Crystallization from Nematic and Isotropic Melts of Cyclohexane–Based Glass–Forming Liquid Crystals", Liquid Crystals, vol. 19, No. 6, 785–790 (1995).

Katsis, D. et al., "Vitrified Chiral–Nematic Liquid Crystalline Films for Selective Reflection and Circular Polarization", Chem. Mater., vol. 11, No. 6, 1590–1596 (1999).

Chen, S. H. et al., "Circularly Polarized Light Generated by Photoexcitation of Luminophores in Glassy Liquid–Crystal Films", Nature, vol. 397, 506–508 (1999).

Collington, E. et al., "Selective Deprotection of Alcoholic and Phenolic Silyl Ethers", Tetrahedron Letters, vol. 26, No. 5, 681–684 (1985).

Moore, J. S. et al., "Room Temperature Polyesterification", Macromolecules, vol. 23, No. 1, 65–70 (1990).

Mastrangelo, J. et al., "Glass–Forming Ability and Morphological Stability of Cyclohexane and Biocyclooctene Rings Containing Disperse Red 1", Chem. Mater., vol. 7, No. 10, 1904–1908 (1995).

Iordache, F. et al., "Bicyclo[2,2,2,]Octane Derivatives, I Stereoisomeric 5,6,7,8–Tetracarbomethoxybicyclo[2,2,2] Oct–2–Enes", Revue Roumaine de Chimie, vol. 20, No. 2, 233–240 (1975).

Shi, H. et al., "Novel Glass–Forming Liquid Crystals. III Helical Sense and Twisting Power in Chiral Nematic Systems", Liquid Crystals, vol. 19, No. 6, 849–861 (1995).

Chen, S.H. et al., "Circularly Polarized Light Produced with Glassy Liquid–Crystal Films", Polymer Preprints vol. 40, No. 2, 1171–1172 (1999).

Eichler, H. et al., "New Glassy Liquid Crystals for Optical Data–Storage Applications", Appl. Phys. B 61, 59–62 (1995).

Gonzalez, Y. et al., "Glassy Mesophases and Ferroelectric Properties of Chiral Low Molar Mass Liquid Crystals", Chem. Mater., vol. 9, No. 12, 2786–2797 (1997).

Finkelmann, H. et al., "Liquid Crystalline Polymers", Angew. Chem. Int. Ed. Engl. 26, 816–824 (1987).

Wu, S. et al., "Polarized UV Spectroscopy of Conjugated Liquid Crystals", J. Appl. Phys., vol. 68, No. 1, 78–85 (1990).

Gray, G. et al., "Wide Range Nematic Mixtures Incorporating 4"n–Alkyl–4–Cyano–p–Terphenyls", J.C.S. Chem. Comm., 431–432 (1974).

Boller, A. et al., "Synthesis and Mesomorphic Properties of Diphenyl– and Biphenylyl–pyrimidines", Z. Naturforsch. 33b, 433–438 (1978).

Hird, M. et al., "The Synthesis and High Optical Birefringence of Nematogens Incorporating 2,6–Disubstituted Naphthalenes and Terminal Cyano–Substituents", Liquid Crystals, vol. 15, No. 2, 123–150 (1993).

Krishnamurthy, S. et al., "New Thermotropic Chiral Nematic Copolymers. 2. A Study of Helical Sense and Twisting Power Based on Copolymers Containing (S)0(—)–1–Phenylethanol and (R)–(—)–Methyl Mandelate", Macromolecules, vol. 24, No. 12, 3481–3484 (1991).

Krishnamurthy, S. et al., "A Comparative Study of Helical Sense and Twisting Power in Low Molar Mass and Polymeric Chiral Nematics", Macromolecules, vol. 25, No. 18, 4485–4489 (1992).

Chen, S. et al., "New Thermotropic Chiral Nematic Copolymers Using (1S,2S,3S,5R)–(+)–and (1R,2R,3R,5S)–(—)–Isopinocampheol as Building Blocks", Macromolecules, vol. 23, No. 24, 5055–5058 (1990).

Tsai, M.L. et al., "Helical Sense in Thermotropic Liquid Crystal Copolymers in Relation to the Structure of a Pendant Chiral Moiety", Macromolecules, vol. 23, No. 7, 1908–1911 (1990).

GLASS-FORMING LIQUID CRYSTALLINE COMPOSITIONS AND OPTICAL DEVICES FORMED THEREFROM

CROSS-REFERENCE TO RELATED APPLICATION

This application is a division of application Ser. No. 09/740,500, now U.S. Pat. No. 6,558,572 filed Dec. 19, 2000 and issued on May 6, 2003.

This application claims the benefit of Provisional Application Ser. No. 60/171,798, filed Dec. 22, 1999, for GLASS-FORMING LIQUID CRYSTALS, which is herein incorporated by reference.

The U.S. Government has rights in this application pursuant to certain contracts and grants, including DE-FC03-92SF19460.

FIELD OF THE INVENTION

This invention relates to glass-forming liquid crystals (GLC) and, more particularly, to liquid crystalline compositions comprising compounds having a molecular weight in the range of about 1000 to 5000 grams per mole, and to optical devices formed therefrom.

BACKGROUND OF THE INVENTION

Liquid crystallinity is a consequence of spontaneous molecular self-assembly into a uniaxial, lamellar, helical, or columnar arrangement on a macroscopic scale. Because of their unique optical properties, liquid crystals are potentially useful as optical, photonic and optoelectronic devices (see for example Collings, P. J., and Patel, J. S., *Handbook of Liquid Crystal Research*, Oxford University Press, New York, 1997). In some of these applications, such as liquid crystal displays, the material functions in the fluid state where an applied field induces molecular reorientation with a response time on the order of milliseconds. With judiciously designed structural moieties, liquid crystals may also function in the solid state via a photonic or electronic stimulus with a much shorter response time. In addition, liquid crystals can be employed as passive devices in which no switching is involved. With the exception of applications in which molecular reorientation with an applied field is the basis, vitrified liquid crystals with an elevated glass transition temperature, $T_g$, offer long-term mesomorphic stability as well as environmental durability. Whereas glass formation appears to be a privilege of liquid crystalline polymers, their generally high melt viscosity presents a major challenge to processing into large-area thin films. To combine ease of material processing with glass-forming ability in discrete molecular systems, extensive efforts have been made over the last two decades to develop glass-forming liquid crystals (GLCs) with well-defined structures having low to medium molecular weights (see for example Wedler, W. et al., 1991, *J. Mater. Chem.*, 1, 347; Attard, G. S. et al., 1992, *Chem. Mater.*, 4, 1246; Neumann, B. et al., 1997, *Adv. Mater.*, 9, 241; and Gresham, K. D. et al., 1994, *J. Polym. Sci: Part A: Polym. Chem.*, 32, 2039). Applications that have been explored with various GLCs include: optical data storage (see for example Ortler, R. et al., 1989, *Marromol. Chem., Rapid Commun*, 10, 189; and Tamaoki, N. et al., 1997, *Adv. Mater.*, 9, 1102), optical nonlinearity (see for example Wang, H. et al., 1996, *Nature*, 384, 244; and Loddoch, M. et al., 1994, *Appl. Phys. B*, 59, 591), photochromism (see for example Natarajan, L. V. et al., 1991, *Macromolecules*, 24, 6554), tunable filters for optical communication (see for example Morita, Y. et al., 1999, *Jpn. J. Appl. Phys.*, 38, Part. 1, 95), and viewing angle compensation for displays (see for example Van de Witte, P. et al., 1999, *Liquid Crystals*, 26, 1039).

SUMMARY OF THE INVENTION

The present invention is directed to a glass-forming liquid crystal composition comprising a compound having a molecular weight in the range of about 1000 to 5000 grams per mole, and having the formula

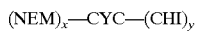

$(NEM)_x$—CYC—$(CHI)_y$ wherein CYC is a substituted cycloaliphatic core moiety containing about 24 to about 60 carbon atoms or a substituted aromatic core moiety containing about 6 to about 36 carbon atoms, NEM is a nematogenic pendant moiety, CHI is a chiral pendant moiety, x is 3 to 9, and y is 0 to 4. The invention is further directed to an optical device formed from the liquid crystal composition.

DETAILED DESCRIPTION OF THE INVENTION

Figure 1A:
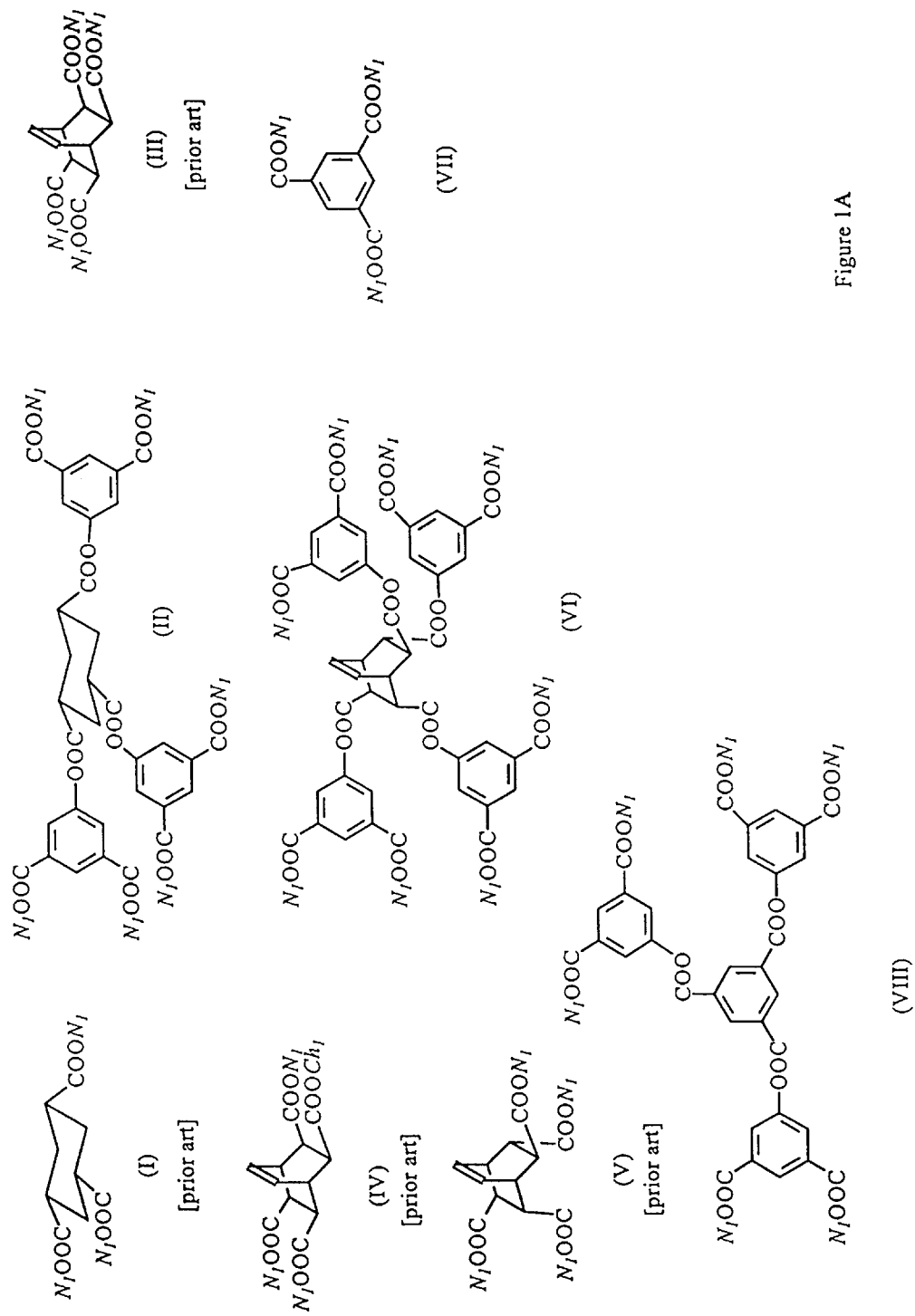
FIGS. 1A–1D depict the molecular structures of liquid crystalline structures of compounds of the prior art and of the present invention, as well as the structures of nematogenic and chiral moieties included in the compounds.

Nematogenic and chiral moieties suitable for the practice of the present invention are discussed in U.S. Pat. Nos. 5,378,393 and 5,514,296, the disclosures of which are incorporated herein by reference.

A nematogenic moiety contains a mesogenic group, which imparts liquid crystalline characteristics to the moiety and to compositions formed from it. This mesogenic group, which typically has a rod-shaped molecular structure (cf. H. Finkelmann, *Angew. Chem. Int. Ed. Engl.*, 1987, vol. 26, pp. 816–824), is attached to a flexible link, which is typically an alkylene radical. To obtain a liquid crystalline composition with high optical birefringence, it is desirable that substituent groups in nematogenic moieties contain a multiplicity of conjugated unsaturated bonds; however, this conjugated unsaturation must not cause substantial absorption of light in the visible region by the liquid crystalline composition. Useful mesogenic groups for the practice of the present invention include: biphenyl and diphenylacetylene moieties described in the aforementioned paper by Finkelmann and by Wu et al., *J. Appl. Phys.*, 1990, vol. 68, pp. 78–85; terphenyl groups described by Gray et al., *J. Chem Soc., Chem. Commun.*, 1974, pp. 431–432; diphenylpyrimidines, as reported by Boller et al., *Z. Naturforsch*, 1978, vol. 33b, pp. 433–438; and 2,6-disubstituted naphthalene moieties, as described by Hird et al., *Liquid Crystals*, 1993, vol. 15(2) pp. 123–150. An acetylenic moiety, —C≡C—, and a carbonyloxyphenyl moiety are preferred groups. Suitable terminal substituents are included in the aforementioned papers of Finkelmann and Wu et al.; preferred terminal substituents are cyano or methoxy.

A chiral moiety contains an optically active chiral group that includes at least one asymmetric carbon atom and is joined to a link, which is typically an alkylene radical.

Compounds comprising the chiral nematic liquid crystalline compositions of the invention are esters, amides, acetals, or ketals. Esters and amides are formed by the reaction of reactive equivalents of carboxylic acids, for example, carboxyl halides, carboxylic anhydrides, and carboxylic esters derived from volatile, low molecular weight alcohols with alcohols and amines, respectively. The carboxylic acid reactive equivalent can be present in the reactant that provides the cycloaliphatic radical, with the reactants that provide the nematogenic and chiral moieties being amines or alcohols. Alternatively, the reactant that is the source of the cycloaliphatic radical can contain amino or hydroxy groups, with the carboxylic acid reactive equivalents being included in the reactants that provide the nematogenic and chiral moieties. Acetals and ketals can be formed by the acid-catalyzed condensation of alcohols containing nematogenic or chiral substituents with aldehydes or ketones, respectively, which are the source of the cycloaliphatic radicals. The aforementioned aldehydes or ketones can also include nematogenic or chiral substituents.

A liquid crystalline composition of the present invention that includes a chiral moiety as described above exhibits selective reflection of visible and near infrared circular-polarized light of wavelength $\lambda_R$. The selective reflection wavelength $\lambda_R$ can be varied by changes in the structure and concentration of the chiral moiety in the liquid crystalline composition. To achieve liquid crystalline compositions whose selective reflection wavelengths are in the visible region, it is necessary that the compositions exhibit adequate helical twisting power. The helical twisting power of a chiral liquid crystalline composition can be determined from the slope of the plot of the reciprocal of the selective reflection wavelength $1/\lambda_R$ vs the mole fraction of the chiral component as the mole fraction approaches zero (cf. S. Krishnamurthy and S. H. Chen, *Macromolecules*, 1991, vol. 24, pp. 3481–3484; 1992, vol. 25, pp. 4485–4489). Helical twisting power of chiral nematic liquid crystalline compositions depends not only on the structure of the chiral moieties but also on the structure of the nematogentic moieties, in particular, the extent of the conjugated unsaturation and the length of the flexible link in these moieties (cf. S. Chen and M. L. Tsai, *Macromolecules*, 1990, vol. 23, pp. 5055–5058).

Many applications of the chiral liquid crystalline compositions of the present invention require a pair of structurally related compositions, one capable of forming a right-handed and the other a left-handed helical structure, which enables them to selectively reflect right-handed and left-handed circular-polarized light, respectively. Using an enantiomeric pair of compounds to form two chiral moieties of opposite chirality, which are then combined with a common nematogenic moiety, provides a pair of liquid crystalline compositions capable of forming right- and left-handed helices.

This is illustrated, for example, by the chiral nematic liquid crystalline copolymers containing chiral moieties prepared from R-(+)- and S-(−)-1-phenylethylamine that form helical structures of opposite handedness, as described in M. L. Tsai and S. H. Chen, *Macromolecules*, 1990, vol. 23, pp. 1908–1911.

In accordance with the present invention, optically active compounds preferred for preparing chiral moieties as described above include the enantimomers of 1-phenylethanol, 1-phenylpropanol, 2-methoxy-2-phenylethanol, mandelic acid methyl ester, α-tetralol, 1-phenylethylamine, 1-cyclohexylethylamine, and 3-amino-ε-caprolactam, camphorcarboxylic acid, menthyloxacetic acid, 1-methyl-2 oxocyclohexanepropionic acid methyl ester, 2-phenylpropionic acid, and camphor. Especially preferred are the enantiomeric pairs of 1-phenylethanol and 1-phenylethylamine.

CYC cycloaliphatic moieties useful in the present invention may include polyvalent radicals derived from any of the compounds listed in Table 1 in columns 4–5 of U.S. Pat. No. 5,378,393. Preferred polyvalent radicals are those derived from adamantane, bicyclooctene, cyclohexane, and cubane.

The term aromatic core moieties in addition to those derived from benzene and naphthalene may also include heteroaromatic moieties such as those derived from furan and thiophene.

Materials Synthesis and Purification Procedures

All chemicals, reagents, and solvents were used as received from Aldrich Chemical Company or VWR Scientific with the following exceptions. Tetrahydrofuran (99%) was dried by refluxing over sodium in the presence of benzophenone until blue then distilled for use. Silica gel 60 (EM Science, 230–400 mesh) was used for liquid chromatography.

Synthesis and purification of intermediates and final products were carried out following FIGS. 5–11. Experimental procedures are described in what follows.

Cis, cis-cyclohexane-1,3,5-tricarboxylic acid, tris{3-[6'-(4"-cyanophenyl) 2'-naphthyloxy]-1-propyl ester}, (I)

The synthesis and purification of this nematic GLC was reported in Chen et al., *Liquid Crystals*, 1997, 21, 683.

1-t-Butyldimethylsilyloxy-3,5-benzenedicarboxylic acid, (a)

5-Hydroxyisophthalic acid (9.11 g, 50.0 mmole) and t-butyldimethylsilyl chloride (25.2 g, 167 mmole) were dissolved in anhydrous N,N-dimethylformamide (55 ml). Upon adding imidazole (20.4 g, 300 mmole), the solution was stirred overnight before shaking with diethyl ether (200 ml) and water (600 ml). The organic layer was reduced in volume by evaporation to a clear oil, which was mixed with tetrahydrofuran (45 ml), water (30 ml), glacial acetic acid (30 ml) and acidified with 37% HCl solution. The reaction mixture was stirred for a couple of hours. Upon evaporating off THF, the solution was shaken with methylene chloride (200 ml) and water (200 ml). The organic was washed twice with water (200 ml each), and the insoluble product was collected by filtration. Additional product was collected by washing with water the solid residue from evaporating off the solvent. A total of 10.1 g (68%) of (a) was obtained with its structure validated by proton NMR spectroscopy.

2-(3'-Hydroxy-1'-propyloxy)-6-(4"-cyanophenyl) naphthalene, (b)

The synthesis and purification of this nematic precursor was reported in Chen et al., *Liquid Crystals*, 1997, 21, 683.

1-t-Butyldimethylsilyloxy-3,5-benzenedicarboxylic acid, bis{3-[6'-(4"-cyanophenyl)-2'-naphthyloxy]-1-propyl ester}, (c)

Intermediate (a) (1.80 g, 6.07 mmole), intermediate (b) (3.63 g, 12.0 mmole), and triphenylphosphine (3.29 g, 12.6 mmole) were dissolved in anhydrous tetrahydrofuran (80 ml). Upon addition of diethylazodicarboxylate, DEAD, (2.1 ml, 13.3 mmole), the solution was stirred overnight. The solid residue resulting from evaporation to dryness was mixed with methylene chloride, and the insolubles were filtered off. The crude product in the filtrate was purified by silica gel column chromatography with methylene chloride as the eluent to obtain (c) in 3.49 g (67%) with its structure validated by proton NMR spectroscopy.

1-Hydroxy-3,5-benzenedicarboxylic acid, bis{3-[6'-(4"-cyanophenyl)-2'-naphthyloxy]-1-propyl ester}, (d)

Intermediate (c) (3.48 g, 4.0 mmole) was dissolved in tetrahydrofuran (30 ml) and acetone (5 ml) at room temperature. The solution was then chilled in an ice water bath. Tetrabutylammonium fluoride, TBAF, solution (1 M, 5 ml, 5.0 mmole) was added over 15 min with subsequent stirring for 30 min. The reaction was quenched with ammonium chloride (0.78 g, 14.5 mmole) in water (10 ml). After stirring for 10 min, the solution was shaken with methylene chloride (200 ml) and water (200 ml). The volume of the organic layer was reduced to 40 ml via evaporation. The solid product in 2.08 g (66%) was collected by filtration with its structure validated by proton NMR spectroscopy.

Cis, cis-cyclohexane-1,3,5-tricarboxylic acid, tris{3,5-bis{3'-[6"-(4'''-cyanophenyl)-2"-naphthyloxy]-1'-propyloxycarbonyl}phenyl ester}, (II)

Intermediate (d) (2.05 g, 2.63 mmole), cis,cis-1,3,5-cyclohexanetricarboxylic acid (0.19 g, 8.7 mmole), and triphenylphosphine (0.74 g, 2.83 mmole) were dissolved in anhydrous tetrahydrofuran (20 ml) and anhydrous N,N-dimethylformamide (10 ml). Diethylazodicarboxylate (0.45 ml, 2.85 mmole) was added to the solution over 5 min, and the reaction mixture was stirred for two days. Upon reducing the volume by evaporation, the reaction mixture was shaken with methylene chloride (100 ml) and water (100 ml). The organic layer was dried over anhydrous $MgSO_4$, and the volume was reduced by evaporation. Upon column chromatography on silica gel using a gradient elution from methylene chloride to methylene chloride:acetone (30:1) with subsequent precipitation into ethanol, (II) was obtained in 0.40 g (18%). Proton NMR spectral data, $\delta$ ($CD_3Cl$): 8.63–7.11 (m, 69H, aromatic), 4.62 (t, 12H, $COOCH_2CH_2$), 4.23 (t, 12H, $CH_2CH_2O$), 2.92–2.63 (m, 6H, cis-cyclohexane ring), 2.34 (m, 6H, $CH_2CH_2CH_2$), 1.80–1.98 (m, 3H, cis-cyclohexane ring). Anal. Calcd. for $C_{153}H_{114}N_6O_{24}$: C, 75.92; H, 4.75; N, 3.47. Found: C, 75.87; H, 4.88; N, 3.50%.

4-[(S)-(−)-1-phenylethyl]-4-[(2-hydroxyethoxy)-benzoyloxy] benzamide, (e)

The synthesis and purification of this chiral precursor was reported in Katsis et al., *Chem. Mater.*, 1999, 11, 1590.

Exo, exo-bicyclo[2.2.2]oct-7-ene-2,3,5,6-tetracarboxylic acid, tetrakis{3-[6'-(4"-cyanophenyl)-2'-naphthyloxy]-1-propyl ester}, (III), and exo, exo-Bicyclo[2.2.2]oct-7-ene-2,3,5,6-tetracarboxylic acid, tris{3-[6'-(4"-cyanophenyl)-2'-naphthyloxy]-1-propyl ester}, mono (S)-(−)-2-{4'-[4"-(1'''-phenyl-ethylcarbamoyl)phenoxycarbonyl]phenoxy ethyl ester}, (IV)

Intermediate (b), (1.00 g, 3.30 mmole), intermediate (e) (0.45 g, 1.12 mmole), all exo-bicyclo-[2.2.2.]oct-7-ene-2,3,5,6-tetracarboxylic acid (0.31 g, 1.10 mmole), and triphenylphosphine (1.21 g, 4.61 mmole) were added to anhydrous tetrahydrofuran (20 ml) and anhydrous N,N'-dimethylformamide (5 ml). Complete dissolution occurred upon addition of diethylazodicarboxylate (0.76 ml, 4.8 mmole). The reaction mixture was stirred overnight, and its volume was reduced by evaporation for precipitation into ethanol. The crude product was purified by column chromatography on silica gel with a gradient elution from methylene chloride to methylene chloride:acetone (20:1) followed by precipitation into ethanol to yield (III) in 0.29 g (18%) and (II) in 0.40 g (24%). (III): Proton NMR spectral data, $\delta$ ($CD_3Cl$): 7.98–7.04 (m, 40H, aromatic), 6.40 (m, 2H, olefinic), 4.33–4.12 (m, 8H, $COOCH_2CH_2$, exo), 4.04 (t, 8H, $CH_2CH_2O$), 3.39 (m, 2H, CH, bridgehead), 3.11 (s, 4H,CH, tertiary), 2.09 (m, 8H, $CH_2CH_2CH_2$). Anal. Calcd. for $C_{92}H_{72}N_4O_{12}$: C, 77.51; H, 5.09; N, 3.93. Found: C, 77.37; H, 4.83; N, 4.17%; (IV): Proton NMR spectral data, $\delta$ ($CD_3Cl$): 8.12–7.04 (m, 43H, aromatic), 6.48–6.33 (m, 3H, olefinic and CONH), 5.38 (m, 1H, $NHCH(CH_3)$), 4.44–3.99 (m, 16H, $COOCH_2CH_2CH_2O$ and $COOCH_2CH_2O$), 3.41 (d, 2H, CH, bridgehead), 3.13 (d, 4H, CH, tertiary), 2.12 (m, 6H, $CH_2CH_2CH_2$), 1.63 (d, 3H, $CH(CH_3)$). Anal. Calcd. for $C_{96}H_{78}N_4O_{15}$: C, 75.48; H, 5.15; N, 3.67. Found: C, 74.88; H, 5.27; N, 3.90%.

Bicyclo[2.2.2]oct-7-ene-(2,5)-exo-(3,6)-endo-tetracarboxylic acid, 3,6-dimethylester, (f)

Exo,exo-bicyclo[2.2.2]-7-ene-tetracarboxylic dianhydride (10.0 g, 40 mmole) and sodium methoxide (7.00 g, 130 mmole) were added to anhydrous methanol (150 ml). Upon refluxing overnight, the solvent was removed by evaporation before adding water (30 ml). The solution was kept below 4° C. while the solution was acidified with HCl solution (2 M). The solid product was collected by filtration, yielding 3.5 g (28%), and its structure validated by proton NMR spectroscopy.

Bicyclo[2.2.2]oct-7-ene-(2,5)-exo-(3,6)-endo-tetracarboxylic acid, (g)

Intermediate (f) (2.60 g, 8.3 mmole) was dissolved in NaOH solution (10%, 20 ml). Upon refluxing for 2 h, the reaction mixture was acidified with HCl solution (2 M). The solid product was collected by filtration, yielding 1.0 g (42%), and its structure validated by elemental analysis and proton NMR spectroscopy.

Bicyclo[2,2,2]oct-7-ene-2,5,-exo-3,6-endo-tetracarboxylic acid, tetrakis{3-[6'-(4"-cyanophenyl)-2'-naphthyloxy]-1-propyl ester}, (V)

Intermediate (g) (0.15 g, 0.54 mmole), intermediate (b) (0.70 g, 2.31 mmole), dicyclohexylcarbodiimide, DCC, (0.54 g, 2.6 mmole), p-toluenesulphonic acid (10 mg) were dissolved in pyridine (6 ml). The reaction mixture was stirred at room temperature overnight before adding acetic acid (1 ml) to consume excess DCC. Upon filtering off solid residues, 50 ml water was added for acidification with HCl solution (2 M). The resulting solid was dissolved in methylene chloride (100 ml) for extraction with $NaHCO_3$ solution (10%, 100 ml×2) and water (100 ml×2). The organic layer was dried over anhydrous $MgSO_4$. The crude product was purified by column chromatography on silica gel via a gradient elution from methylene chloride:acetone (200:1) to (50:1), yielding (V) in 0.50 g (65%). Proton NMR spectral data, $\delta$ ($CD_3Cl$): 7.98–7.04 (m, 40H, 6.31 (m, 2H, olefinic), 4.35 (m, 4H, $COOCH_2CH_2$, endo), 4.23 (m, 4H, COOCH$_2$CH$_2$, exo), 4.07 (t, 4H, CH$_2$CH$_2$O, endo), 4.00 (t, 4H, CH$_2$CH$_2$O, exo), 3.57 (m, 2H, CH, bridgehead), 3.28 ([m, 2H, CH, tertiary, endo), 3.02 (m, 2H, CH, tertiary, exo), 2.15 (m, 4H, CH$_2$CH$_2$CH$_2$, endo), 2.05 (m, 4H, CH$_2$CH$_2$CH$_2$, exo). Anal. Calcd. for C$_{92}$H$_{72}$N$_4$O$_{12}$: C, 77.51; H, 5.09; N, 3.93. Found: C, 77.21; H, 5.29; N, 3.84%.

Bicyclo[2.2.2]oct-7-ene-2,5-exo-3,6-endo-tetracarboxylic acid, tetrakis{3,5-bis{3'-[6"-(4'''-cyanophenyl)-2"-naphthyloxy]-1'-propyloxycarbonyl}phenyl ester), (VI)

Dry tetrahydrofuran (25 ml) was added to intermediates (d) (1.00 g, 1.33 mmole) and (g) (0.092 g, 0.32 mmole), p-toluenesulphonic acid/4-dimethylaminiopyridine salt (0.10 g, 0.34 mmole), and dicyclohexylcarbodiimide (0.31 g, 1.48 mmole). Upon stirring overnight, the insolubles were filtered off, and the filtrate was evaporated to dryness. The solid residue was shaken with methylene chloride (100 ml) and dilute acetic acid solution(100 ml). The organic layer was washed sequentially with water, saturated NaHCO$_3$ solution, water, and saturated brine (100 ml each) and then dried over anhydrous MgSO$_4$. The solution was reduced to 25 ml in volume afterwards. After removing the insolubles, the crude product was purified by silica gel column chromatography with methylene chloride:acetone (30:1) as the eluent. Further purification was accomplished by precipitation into ethanol to yield (VI) in 0.84 g (78%). Proton NMR spectral data, δ (CD$_3$Cl): 8.66–7.04 (m, 92H, aromatic), 6.51 (m, 2H, olefinic), 4.62–4.40 (m, 16H, COOCH$_2$CH$_2$, endo and exo), 4.35–4.16 (m, 16H, CH$_2$CH$_2$O, endo and exo), 4.10 (m, 2H, CH, bridgehead), 3.86 (m, 2H, CH, tertiary, endo), 3.55 (m, 2H, CH, tertiary, exo), 2.40–2.10 (m, 16H, CH$_2$CH$_2$CH$_2$, endo and exo). Anal. Calcd. for C$_{204}$H$_{148}$N$_8$O$_{32}$: C, 76.01; H, 4.63; N, 3.48. Found: C, 75.62; H, 4.81; N, 3.61%.

1,3,5-Benzenetricarboxylic acid, tris{3-[6'-(4"-cyanophenyl)-2'-naphthyloxy]-1-propyl ester}, (VII)

Benzene-1,3,5-tricarbonyl trichloride (0.28 g, 1.08 mmol), intermediate (b) (1.00 g, 3.3 mmol), and 4-dimethylaminopyridine (0.80 g, 6.6 mmol) were dissolved in 15 ml anhydrous THF. The solvent was removed by evaporation after 3 h reflux. The residue was dissolved in CH$_2$Cl$_2$ for washing sequentially with HCl solution (1 M), NaHCO$_3$ solution (10%), and water. The organic layer was dried over anhydrous MgSO$_4$. Further purification was carried out by silica gel column chromatography with methylene chloride as the eluent to yield (VII) in 0.80 g (73%). Proton NMR spectral data, δ (CD$_3$Cl): 8.90–7.11 (m, 33H, aromatic), 4.70 (t, 6H, COOCH$_2$CH$_2$), 4.26 (t, 6H, CH$_2$CH$_2$O), 2.30 (m, 6H, CH$_2$CH$_2$CH$_2$). Anal. Calcd. for C$_{69}$H$_{51}$N$_3$O$_9$: C, 77.73; H, 4.82; N, 3.94. Found: C, 77.29; H, 4.86; N, 3.85%.

1,3,5-Benzenetricarboxylic acid, tris{3,5-bis{3'-[6"-(4'''-cyanophenyl)-2"-naphthyloxy]-1'-propyloxycarbonyl}phenyl ester}, (VIII)

Intermediate (d) (0.50 g, 0.66 mmole), 1,3,5-benzenetricarbonyl chloride (0.055 g, 0.21 mmole), and 4-dimethylaminopyridine (0.16 g, 1.3 mmole) were dissolved in anhydrous tetrahydrofuran (25 ml). Upon refluxing for 3 h, the reaction mixture was poured into water (70 ml). The solid was collected by filtration for silica gel column chromatography with a gradient elution from methylene chloride to methylene chloride:acetone (25:1). Compound (VIII) was obtained in 0.30 g (59%). Proton NMR spectral data, δ (CD$_3$Cl): 9.52–7.11 (m, 72H, aromatic), 4.66 (t, 12H, COOCH$_2$CH$_2$), 4.28 (t, 12H, CH$_2$CH$_2$O), 2.39 (m, 12H, CH$_2$CH$_2$CH$_2$). Anal. Calcd. for C$_{153}$H$_{108}$N$_6$O$_{24}$: C, 76.11; H, 4.51; N, 3.48. Found: C, 76.03; H, 4.62; N, 3.53%.

2-(2-Hydroxyethoxy)-6-bromonaphthalene, (h)

To a solution of 6-bromo-2-naphthol (15.1 g, 67.7 mmol), 2-bromoethanol (10.11 g, 80.9 mmol) in N,N-dimethylformamide (60 ml) was added a solution of KOH (5.41 g, 81.9 mmol) and KI (0.37 g, 2.20 mmol) in water (10 ml). Upon stirring at 85° C. for 4 hours, the reaction mixture was filtered. The filtrate was shaken with diethyl ether (400 ml) and water (400 ml). The organic layer was washed with 2% KOH (100 ml water). The solvent was evaporated off to obtain crude product. Recrystallization from a mixed solvent of methanol (20 ml) and water (200 ml) yielded (h) in 10.0 g (55%). Proton-NMR spectral data (CDCl$_3$), δ(ppm): 2.16 (t, HOCH$_2$, 1H), 4.10 (m, HOCH$_2$CH$_2$, 2H), 4.22 (t, ArOCH$_2$CH$_2$,2H), 7.10–7.95 (m, aromatic, 6H).

2-[6'-(4"-Cyanophenyl)-2'-naphthyl]-1-ethanol, (i)

A biphasic mixture of benzene (52 ml), ethanol (7 ml) and 2M Na$_2$CO$_3$ (59 ml) was sparged with argon for 20 minutes before adding 4-cyanobenzeneboronic acid (3.85 g, 26.2 mmol), (h) (6.619 g, 24.78 mmol) and triphenylphosphine (0.65 g, 0.55 mmol). The reaction mixture was refluxed under argon overnight. Evaporation to dryness resulted in crude product, which was purified by recrystallization from ethyl acetate to obtain (i) in 5.32 (74%). Proton-NMR spectral data (CDCl$_3$), δ (ppm): 4.08 (t, HOCH$_2$CH$_2$, 2H), 4.26 (t, ArOCH$_2$CH$_2$, 2H), 7.21–8.00 (m, aromatic, 10H)

1-t-Butyldimethylsilyloxy-3,5-benzenedicarboxylic acid, bis{2-[6'-(4"-cyanophenyl)-2'-naphthyloxy]-1-ethyl ester}, (j)

Intermediate (i) (4.289 g, 14.82 mmol), 1-t-butyldimethylsilyloxy-3,5-benzene-dicarboxylic acid (2.179 g, 7.85 mmol), and triphenylphosphine (4.099 g, 15.63 mmol) were dissolved in dry tetrahydrofuran (60 ml) under argon then chill in an ice bath. Diethyl azodicarboxylate, DEAD, (2.6 ml, 16.5 mmol) was slowly added to the solution, which was then stirred overnight at room temperature. The reaction mixture was evaporated to dryness, and the solid residue was dissolve in methylene chloride for silica gel column chromatography with methylene chloride as the eluent to yield (j) (4.68 g, 76%). Proton-NMR spectral data (CDCl$_3$), δ (ppm):–0.04 (s, Si(CH$_3$)$_2$, 6H), 0.83 (s, Si(C(CH$_3$)$_3$, 9H), 4.44 (ArOCH$_2$CH$_2$, 4H), 4.69 (t, COOCH$_2$CH$_2$, 4H), 7.18–8.26 (m, aromatic, 23H)

1-Hydroxy-3,5-benzenedicarboxylic acid, bis{2-[6'-(4"-cyanophenyl)-2'-naphthyloxy]-1-ethyl ester}, (k)

Intermediate (I) (5.8 g, 6.9 mmol) was dissolved in a mixed solvent of tetrahydrofuran (50 ml) and acetone (10 ml). The solution was chilled in an ice bath before adding tetrabutylammonium fluoride, TBAF, (1 M in THF, 8.5 ml) over 7 minutes. The reaction was quenched after 45 minutes by adding a solution of ammonium chloride (0.65 g, 12 mmol) in water (6.5 ml). The solution was then shaken with methylene chloride (200 ml) and water (100 ml). The organic portion was washed with water (100 ml×2) and saturated brine (50 ml) and then dried over anhydrous MgSO$_4$. The crude product resulting from evaporating off the solvent was purified by recrystallization from acetone and then from methylene chloride to yield (k) (4.15 g, 83%). Proton-NMR spectral data (DMSO-$d_6$), δ (ppm): 4.26 (ArOCH$_2$CH$_2$, 4H), 4.67 (t, COOCH$_2$CH$_2$, 4H), 7.15–8.23 (m, aromatic, 23H), 10.31 (s, HOAr, 1H)

Cis-cis-1,3,5-cyclohexanetricarboxylic acid, tris{3, 5-bis{2'-[6"-4'"-cyanophenyl)-2"-naphthyloxy]1'-ethyloxycarbonyl}phenyl ester}, (IX)

A reaction mixture was prepared by dissolving (k) (0.997 g, 1.39 mmol), cis-cis-1,3,5-cyclohexanetricarboxylic acid (0.100 g, 0.46 mmol), and p-toluenesulphonic acid 4-dimethylaminopyridine complex (0.0544 g, 0.18 mmol) in dry tetrahydrofuran (10 ml). Upon adding N,N'-dicyclohexylcarbodiimide (0.397 g, 1.94 mmol), the reaction mixture was refluxed for 36 hours. Crude product was collected by precipitation of a methylene chloride solution into ethanol. Purification was accomplished by silica gel column chromatography with a gradient elution from methylene chloride to methylene chloride:acetone (30:1). The product was further purified by precipitation from a methylene chloride solution into ethanol to obtain (IX) (0.489 g, 46%). Proton-NMR spectral data (CDCl$_3$), δ (ppm): 1.85–2.05 (m, cyclohexane, 3H), 2.60–2.90 (m, cyclohexane, 6H), 4.43 (t, ArOCH$_2$CH$_2$, 12H), 4.79 (t, COOCH$_2$CH$_2$, 12H), 7.15–8.65 (m, aromatic, 69H). Analysis calculated for C$_{147}$H$_{102}$N$_6$O$_{24}$: C, 75.57; H, 4.40; N, 3.60. Found C, 75.18; H, 4.42; N, 3.63.

Bicyclo[2.2.2.]oct-7-ene-(2,5)exo-(3,6)-endo-tetracarboxylic acid, tetrakis{3,5-bis{2'-[6"-(4'"-cyanophenyl)-2"-naphthyloxy]1'-ethyloxycarbonyl}phenyl ester}, (X)

Intermediate (k) (0.849 g, 1.17 mmol), bicyclo[2.2.2.]oct-7-ene-(2,5)exo-(3,6)-endo-tetracarboxylic acid (0.0836 g, 0.29 mmol), N,N'-dicyclohexylcarbodiimide (0.293 g, 1.42 mmol) and p-toluenesulphonic acid 4-dimethylaminopyridine complex (0.0723 g, 0.24 mmol) were dissolved in dry tetrahydrofuran (10 ml) and dry N,N'-dimethyl-formamide (4 ml). The reaction mixture was stirred overnight under argon at room temperature followed by shaking with methylene chloride (50 ml) and dilute acetic acid (50 ml). The organic portion was washed with water (25 ml) and saturated NaHCO$_3$ (25 ml) before drying over anhydrous MgSO$_4$. The crude solid product resulting from evaporating off the solvent was purified by silica gel column chromatography with a gradient elution from methylene chloride:hexanes (24:1) to methylene chloride:acetone (30:1). The product was further purified by precipitation from a methylene chloride solution into ethanol to obtain (X) (0.46 g, 50%). Proton-NMR spectral data (CDCl$_3$), δ (ppm): 3.50–4.05 (m, bicyclooctene endo-exo, 8H), 4.25–4.85 (m, COOCH$_2$CH$_2$OAr, 32H), 7.05–8.70 (m, aromatic, 92H). Analysis calculated for C$_{196}$H$_{132}$N$_8$O$_{32}$: C, 75.67; H, 4.28; N, 3.60. Found C, 75.19; H, 4.41; N, 3.75.

2-(3'-p-Toluenesulphonyl-1'-propyloxy)-6-(4"cyanophenyl)naphthalene, (l)

2-(3'-Hydroxy-1'-propyloxy)-6-(4"cyanophenyl) naphthalene (2.872 g, 9.47 mmol), was dissolved in dry pyridine (15 ml) under argon. The solution was then chilled in an ice water bath before quickly adding p-toluenesulphonyl chloride (5.1 g, 26 75 mmol). After chilling in a cold bath for 5 minutes, the reaction mixture was stirred at room temperature for 4 hours before pouring into vigorously stirred ice water (150 ml). The crude solid product was washed with water and then recrystallized from a mixed solvent of ethanol (50 ml) and acetone (120 ml) to obtain (l) (3.38 g, 78%). Proton-NMR spectral data (CDCl$_3$), δ (ppm): 2.21 (p, CH$_2$CH$_2$CH$_2$, 2H), 2.31 (s ArCH$_3$, 3H), 4.11 (t, ArOCH$_2$CH$_2$, 2H), 4.32 (t, SO$_3$CH$_2$CH$_2$, 2H), 7.05–8.00 (m, aromatic, 14H)

3,4,5-Trihydroxybenzoic acid 2-hydroxy-ethyl ester, (m)

A mixture consisting of ethylene glycol (105 g, 1.11 mol), gallic acid (28.5 g, 168 mmol), and concentrated H$_2$SO$_4$ (10 drops) was stirred at 90° C. overnight before mixing with ice water (1500 ml). Upon adding NaCl (100 g), the solution was extracted with ethyl acetate (150 ml×4). The combined organic portion was evaporated to dryness to obtain (m) (9.98 g, 28%). Proton-NMR spectral data (DMSO-$d_6$), δ (ppm): 3.64 (t, HOCH$_2$CH$_2$, 2H), 4.15 (t, ArOCH$_2$CH$_2$, 2H), 6.93 (s, aromatic, 2H)

3,4,5-Tris{3'-[6"-(4'"-cyanophenyl)-2"-naphthyloxy] propyloxy}benzoic acid, hydroxyethyl ester, (n)

A solution containing (l) (1.629 g, 3.56 mmol), (m) (0.254 g, 1.18 mmol), and finely ground potassium carbonate (0.504 g, 3.64 mmol) with a catalytic amount of potassium iodide in a mixed solvent of acetone (16 ml), N,N-dimethylformamide (6 ml) and water (0.5 ml) was refluxed for 2 days. Upon reducing the volume via evaporation, the crude product resulted from precipitation into dilute HCl (100 ml). The filtrate was shaken with diethyl ether (100 ml) followed by washing with NaHCO$_3$ (50 ml) and saturated brine. Upon evaporating off ether, the crude product was purified by silica gel column chromatography, with a gradient elution from methylene chloride to methylene chloride:acetone (15:1). Further purification was accomplished by recrystallization from a mixed solvent of tetrahydrofuran (5 ml) and acetone (25 ml) to obtain (n) (0.65 g, 51%). Proton-NMR spectral data (DMSO-$d_6$), δ (ppm): 2.04–2.30 (m, CH$_2$CH$_2$CH$_2$, 6H), 3.70 (HOCH$_2$CH$_2$, 2H), 4.10–4.34 (m, ArOCH$_2$CH$_2$CH$_2$OAr and COOCH$_2$CH$_2$, 14H), 7.00–8.19 (m, aromatic, 32H)

Cis-cis-1,3,5-cyclohexanetricaroxylic acid, tris{2-{{3',4,5'-tris{3"-[6'"-(4""-cyanophenyl)-2'"-naphthyloxy]-1"-propyloxy}benzenecarbonyloxy}ethyl}ester, (XI)

Intermediate (n) (0.425 g, 0.40 mmol), cis-cis-1,3,5-cyclohexanetricarboxylic acid (0.0441 g, 0.20 mmol), and triphenylphosphine (0.1834 g, 0.69 mmol) were dissolved in dry tetrahydrofuran (10 ml) and dry N,N-dimethylformamide (4 ml). After addition of DEAD (11.3 ml, 72 mmol), the reaction mixture was stirred overnight under argon at room temperature. Upon reducing the volume by evaporation, the crude product resulted from precipitation into cold ethanol. Purification was accomplished by silica gel column chromatography followed by precipitation from a methylene chloride solution into ethanol to obtain (XI) (0.061 g, 15%). Proton-NMR spectral data (CDCl$_3$), δ (ppm): 1.40–1.60 (m, cyclohexane, 3H), 2.15–2.40 (m, overlap of cyclohexane and CH$_2$CH$_2$CH$_2$, 24H), 4.09–4.45 (ArOCH$_2$CH$_2$ CH$_2$OAr and COOCH$_2$CH$_2$, 48H), 7.00–7.90 (m, aromatic, 96H). Analysis calculated for C$_{216}$H$_{171}$N$_9$O$_{30}$: C, 76.92; H, 5.11; N, 3.74. Found C, 76.57; H, 5.15; N, 3.23.

4-(t-Butyldimethylsilyloxy)benzoic acid, (o)

4-Hydroxybenzoic acid (4.009 g, 28.96 mmol) and tert-butyldimethylsilyl chloride (9.984 g, 66.24 mmol) were dissolved in dry N,N-dimethylformamide (21 ml) containing imidazole (8.653 g, 127.1 mmol). Upon stirring for 10 hours under argon, the reaction mixture was shaken with diethyl ether (130 ml) and water (130 ml). The organic portion was washed with water (60 ml×2). The crude product resulting from evaporating to dryness was dissolved in tetrahydrofuran (32 ml). Methanol (96 ml) and a solution of potassium carbonate (6.40 g, 46.31 mmol) in water (50 ml) were added. The mixture was then stirred for 1 hour. The volume was reduced by half by evaporation before adding a saturated brine (96 ml) followed by acidification with 1M $KHSO_4$. The aqueous portion was washed times with diethyl ether (100 ml×3), and the organic portion was evaporated to dryness. Recrystallization from a mixed solvent of water (200 ml), ethanol (75 ml) and acetone (20 ml) yielded (o) (4.61 g, 63%). Proton-NMR spectral data (acetone-$d_6$), δ (ppm): 0.10 (s, $Si(CH_3)_2$, 6H), 1.02 (s, $Si(C(CH_3)_3$, 9H), 6.99 (d, aromatic, 2H), 7.95 (d, aromatic, 2H)

4-(t-Butyldimethylsilyloxy)benzoic acid, 3,5-bis{3'-[6"-(4'"-cyanophenyl)-2"-naphthalyoxy]-1'-propyloxycarbonyl}phenyl ester, (p)

A reaction mixture consisting of (d) (0.998 g, 1.33 mmol), 4-(t-butyldimethyl-silyloxy)benzoic acid (0.382 g, 1.51 mmol), and N,N'-dicyclohexylcarbodiimide (0.399 g, 1.93 mmol), p-toluenesulphonic acid 4-dimethylaminopyridine complex (0.11 g, 0.37 mmol), dry tetrahydrofuran (20 ml) was refluxed overnight. Solid residues were filtered off, and the filtrate was evaporated to dryness. The crude product was purified by silica gel column chromatography with methylene chloride:acetone (50:1) as the eluent to obtain (p), (0.85 g, 65%). Proton-NMR spectral data (CDCl$_3$), δ (ppm): 0.25 (s, $Si(CH_3)_2$, 6H), 1.02 (s, $Si(C(CH_3)_3$, 9H), 2.38 (p, $CH_2CH_2CH_2$, 4H), 4.25 (t, $ArOCH_2$, 4H), 4.62 (t, $COOCH_2CH_2$, 4H), 6.90–8.85 (m, aromatic, 27H)

Hydroxybenzoic acid, 3,5-bis{3'-[6"-(4'"-cyanophenyl)-2"-naphthalyoxy]-1'-propyloxycarbonyl}phenyl ester, (q)

Intermediate (p) (0.80 g, 0.81 mmol) was dissolved in tetrahydrofuran (10 ml) and chilled in an ice/water/salt bath before adding TBAF (1 M in THF, 1 ml) over 5 minutes. Upon stirring for 45 minutes, the reaction was quenched with ammonium chloride (0.22 g, 4.11 mmol) in water (1 ml). Stirring was continued for additional 15 minutes before shaking with methylene chloride (50 ml) and water (25 ml). The organic portion was washed with water (25 ml×2) before drying over anhydrous MgSO$_4$. Upon evaporating off the solvent, the crude product was recrystallized from tetrahydrofuran and then from acetone to obtain (q), (0.70 g, 78%). Proton-NMR spectral data (DMSO-$d_6$), δ (ppm): 2.22 (p, $CH_2CH_2CH_2$, 4H), 4.25 (t, $ArOCH_2$, 4H), 4.50 (t, $COOCH_2CH_2$, 4H), 6.85–8.42 (m, aromatic, 27H)

Cis-cis-1,3,5-cyclohexanetricaroxylic acid, tris{4-{3,5'-bis{3"-[6'"-(4""-cyanophenyl)-2'"-naphthyloxy]-1"-propyloxycarbonyl}-phenyloxycarbonyl}phenyl}ester, (XII)

Intermediate (q) (0.651 g, 0.75 mmol), cis-cis-1,3,5-cyclohexanetricarboxylic acid (0.0531 g, 0.25 mmol), and N,N'-dicyclohexylcarbodiimide (0.20 g, 0.97 mmol) were dissolved in dry tetrahydrofuran (10 ml) under argon. Upon adding 4-pyrrolidinopyridine (0.12 g, 0.08 mmol), the reaction mixture was stirred overnight at room temperature. Solid residues were removed, and the filtrate was evaporated to dryness. The crude product was dissolved in methylene chloride (50 ml) and then shaken with dilute acetic acid (25 ml). The organic portion was washed with water (25 ml×2) and then dried over anhydrous MgSO$_4$. Further purification was accomplished by silica gel column chromatography, with a gradient elution from methylene chloride methylene chloride:acetone (30:1), followed by precipitation from a methylene chloride solution into methanol to obtain (XII) (0.149 g, 40%). Proton-NMR spectral data (CDCl$_3$), δ (ppm): 1.85–2.05 (m, 3H, cyclohexane), 2.38 (p, $CH_2CH_2CH_2$, 12H), 2.65–3.00 (m, cyclohexane, 6H) 4.26 (t, $ArOCH_2CH_2$, 12H), 4.70 (t, $COOCH_2CH_2$, 12H), 7.10–8.74 (m, aromatic, 81H). Analysis calculated for $C_{174}H_{126}N_6O_{30}$: C, 75.15; H, 4.57; N, 3.02. Found C, 74.95; H, 4.70; N, 3.13.

3-(4'-cyano-p-terphenyloxy)-1-propanol, (r), and 3-[6'-(4-cyanophenyl) 2'-naphthyloxy]-1-propanol, (b), were synthesized following the procedures reported previously.

5-(4-Carboxy-2-nitrophenoxy-1,3-Benzenedicarboxylic acid, tris[3-(4'-cyano-p-terphenyloxy)-1-propyl]ester, (XIII)

DEAD (0.31 ml, 1.97 mmol) was added dropwise to a solution containing 5-(4-carboxy-2-nitrophenoxy-1,3-benzenedicarboxylic acid (158 mg, 0. 455 mmol), (r) (500 mg, 1.52 mmol), and triphenylphosphine (520 mg, 1.98 mmol) in 60 ml anhydrous THF. Upon stirring overnight at room temperature, the reaction mixture was poured into 400 ml methanol, affording a white precipitate collected by filtration and then dissolved in 200 ml methylene chloride. The resulting solution was washed with 10% NaHCO$_3$ (200 ml×2) and then water (200 ml×2) before drying over anhydrous MgSO$_4$. Further purification was accomplished by silica gel column chromatography methylene chloride:acetone (100:1) as the eluent, yielding (XIII) (400 mg, 69%). Proton NMR spectral data (CD$_3$Cl), δ (ppm): 8.67–6.99 (m, 42 H, aromatic H), 4.61 (t, 6H, $COOCH_2CH_2$), 4.19 (t, 6H, $CH_2CH_2O$), 2.32 (q, 6H, $CH_2CH_2CH_2$). Anal. Calcd. for $C_{81}H_{60}N_4O_{12}$: C, 75.92; H, 4.72; N, 4.37. Found: C, 75.84; H, 4.82; N, 4.32%.

5-(4-Carboxy-2-nitrophenoxy-1,3-Benzenedicarboxylic acid, tris{3-[6'-(4-cyanophenyl) 2'-naphthyloxy]-1-propyl} ester, (XIV)

The same procedure as compound (XIII) was followed to produce (XIV) (69%) using Intermediate (b) instead of (r). Proton NMR spectral data (CD$_3$Cl), δ (ppm): 8.65–6.99 (m, 36H, aromatic H), 4.63 (m, 6H, $COOCH_2CH_2$), 4.27 (m, 6H, $CH_2CH_2O$), 2.35 (m, 6H, $CH_2CH_2CH_2$). Anal. Calcd. for $C_{75}H_{54}N_4O_{12}$: C, 74.86; H, 4.52; N, 4.66. Found: C, 75.04; H, 4.61; N, 4.63%.

N-[3-(6'-bromo-2'-naphthoxy)-propyl]-phthalimide, (s)

To a solution of 6-bromo-2-naphthol (15.0 g, 67.0 mmol) and N-(3-bromo-propyl)-phthalimide (18.0 g, 67 mmol) in 250 ml DMF, was added 11.0 g K$_2$CO$_3$ and 1.0 g KI. The resulting suspension was stirred at 80° C. for 24 hours. The reaction mixture was then poured into 400 ml cold water, affording a white precipitate collected by filtration and then dissolved in 200 ml methylene chloride. The solution was washed with 10% NaHCO$_3$ (200 ml×2), water (200 ml×2), and then dried with anhydrous MgSO$_4$ Recrystallization from ethyl acetate yielded (s) (18.0 g, 65%). Proton NMR spectral data (CD$_3$Cl), δ (ppm): 7.90–6.98 (m, 10 H, aromatic H), 4.16 (t, 2H, $NCH_2CH_2CH_2$), 3.96 (t, 2H, $CH_2CH_2CH_2O$), 2.24 (q, 2H, $CH_2CH_2CH_2$).

N-{3-[6'-(4"cyano-phenyl)-2'-naphthoxy]-propyl}-phthalimide, (t)

Triphenylphosphine (1.90 g, 1.63 mmol) was added to a deoxygenated emulsion consisting of compound (s) (22.0 g, 53.7 mmol), 4-cyano-benzene-boronic acid (8.0 g, 54.4 mmol) in benzene (160 ml), and 2 M $Na_2CO_3$ (160 ml). After reflux for 24 hours, the reaction mixture was cooled to room temperature. The crude solid product was dissolved in a minimum amount of hot chloroform for precipitation from methanol, yielding (t) (15.0 g, 65%). Proton NMR spectral data ($CD_3Cl$), δ (ppm): 8.02–7.00 (m, 14H, aromatic H), 4.20 (t, 2H, $NCH_2CH_2CH_2$), 3.98 (t, 2H, $CH_2CH_2CH_2O$), 2.28 (q, 2H, $CH_2CH_2CH_2$).

3-[6'-(4"-Cyno-phenyl)bromo-2'-naphthoxy]-propyl-amine, (u)

A solution containing compound (t) (2.0 g, 0.463 mmol) and $H_2NNH_2 \cdot H_2O$ (1.5 g, 30 mmol) in 20 ml ethanol and 80 ml chloroform was refluxed for 24 hours. Upon evaporation to dryness, the solid residue was stirred with 1 M HCl (50 ml). Then 10% NaOH (50 ml) was added to the solid collected by filtration. The resulting solution was extracted with methylene chloride (50 ml×3). The combined organic portion was dried over anhydrous $MgSO_4$, and the solvent was evaporated off to yield (u) (0.8 g, 59%). Proton NMR spectral data (DMSO-$d_6$), δ(ppm): 8.24–7.18 (m, 10H, aromatic H), 4.17 (t, 2H, $CH_2CH_2CH_2O$), 2.74 (t, 2H, $NCH_2CH_2CH_2$), 1.80 (q, 2H, $CH_2CH_2CH_2$).

Trans-cyclohexane-1,3,5-tricarboxylic acid, tris{N-[3-(4'-cyano-p-terphenyloxy)-1-propyl]}-amide, (XVIII)

Under a nitrogen atmosphere, oxalyl chloride (1.0 ml, 11.0 mmol) was added dropwise to a suspension of trans-1,3,5-cyclohexanetricarboxylic acid (0.220 g, 1.02 mmol) in anyhydrous methylene chloride (20 ml) in the presence of a catalytic amount DMF. After stirring at room temperature for 1 hour, the reaction mixture was refluxed for 3 hours. Upon removing solvent and excess oxalyl chloride by evaporation in vacuo, THF (5 ml) was added to dissolve the solid residue. A solution of (u) (1.00 g, 3.31 mmole) in anhydrous DMF (20 ml) and anhydrous pyridine (1.0 ml) was then added dropwise via a syringe. Upon refluxing for 5 hours, the reaction mixture was poured into cold water (200 ml) and then acidified with 1M HCl. The resulting solid was further purified by silica gel column chromatography with methylene chloride:acetone (100:1) as the eluent, yielding (XVIII) (0.49 g, 49%). Proton NMR spectral data (DMSO-$d_6$), δ (ppm): 8.26–7.18 (m, 30 aromatic H plus 3H on amide), 4.10 (m, 6H, $CH_2CH_2CH_2O$), 3.22 (m, 6H, $NCH_2CH_2CH_2$), 2.66–2.54 (m, 3H, cyclohexane core), 1.96 (m, 6H, $CH_2CH_2CH_2$), 1.91–1.41 (m, 6H, cyclohexane core). Anal. Calcd. for $C_{69}H_{60}N_6O_6$: C, 77.50; H, 5.66; N, 7.86. Found: C, 76.78; H, 5.51; N, 7.73%.

1-t-Butyldimethylsilyloxy-3,5-benzenedicarboxylic acid, bis [3-(4'-cyano-p-terphenyloxy)-1-propyl]ester, (v)

DEAD (1.20 ml, 7.38 mmol) was added dropwise to a solution containing 1-t-butyldimethylsilyloxy-3,5-benzenedicarboxylic acid (0.85 g, 2.87 mmol), (r) (2.00 g, 6.06 mmol), and triphenylphosphine (2.00 g, 7.63 mmol) in 250 ml anhydrous THF. Upon stirring overnight at room temperature, the reaction mixture was poured into 400 ml methanol after reducing the volume to 50 ml. The precipitated crude product collected by filtration was dissolved in 200 ml chloroform. The resulting solution was washed with 10% $NaHCO_3$ (300 ml×2) and water (300 ml×2) consecutively before drying over anhydrous $MgSO_4$. Further purification was accomplished by silica gel column chromatography with methylene chloride as the eluent, yielding (v) (2.3 g, 87%). Proton NMR spectral data ($CD_3Cl$), δ (ppm): 8.32–7.00 (m, 27H, aromatic H), 4.59 (t, 4H, $COOCH_2CH_2$), 4.20 (t, 4H, $CH_2CH_2O$), 2.32 (q, 4H, $CH_2CH_2CH_2$), 1.02 (s, 9H, $SiC(CH_3)_3$, 0.25 (s, 6H, $Si(CH_3)_2$. Anal. Calc.for $C_{58}H_{54}N_2O_7Si_1$: C, 75.79; H, 5.92; N, 3.05. Found: C, 75.58; H, 5.93; N, 3.04%.

1-Hydroxy-3,5-benzenedicarboxylic acid, bis[3-(4'-cyano-p-terphenyloxy)-1-propyl]ester, (w)

To a solution of 1.00 g (v) in 500 ml chloroform was added dropwise TBAF (1M in THF, 4 ml). After stirring for 4 hours at room temperature, HCl (1M, 2 ml) and THF (8 ml) were added. The reaction mixture was then washed twice with water. The organic layer was reduced in volume to 10 ml, from which the white solid precipitated, yielding (w) (0.74 g, 94%). Proton NMR spectral data (DMSO-$d_6$), δ (ppm): 10.32 (s, 1H, phenol H), 8.00–7.03 (m, 27H, Aromatic H), 4.47 (t, 4H, $COOCH_2CH_2$), 4.17 (t, 4H, $CH_2CH_2O$), 2.20(q, 6H, $CH_2CH_2CH_2$).

1-[3-(4'-Cyano-p-terphenyloxy)-1-propxy]-3,5-benzenedicarboxylic acid, bis [3-(4'-cyano-p-terphenyloxy)-1-propyl]ester, (XV)

DEAD (0.14 ml, 0.90 mmol) was added dropwise to a solution of (w) (500 mg, 0.620 mmol) (r) (230 mg, 0.697 mmol), and triphenylphosphine (240 mg, 0.916 mmol) in 30 ml anhydrous THF and 30 ml anhydrous DMF. Upon stirring overnight at room temperature, the reaction mixture was poured into 200 ml methanol, affording a white precipitate, which was collected by filtration and then dissolved in 200 ml methylene chloride. The resulting solution was washed with 10% $NaHCO_3$ (200 ml×2) and water (200 ml×2) consecutively before drying over anhydrous $MgSO_4$. Further purification by silica gel column chromatography, with methylene chloride:acetone (50:1) as the eluent, yielded (XV) (350 mg, 51%). Proton NMR spectral data ($CDCl_3$), δ (ppm): 8.32–7.01 (m, 39H, Aromatic H), 4.60 (t, 4H, $COOCH_2CH_2$), 4.25 (m, 8H, $OCH_2CH_2CH_2O$, $COOCH_2CH_2O$, overlap), 2.33 (6H, $CH_2CH_2CH_2$). Anal. Calcd. for $C_{74}H_{57}N_3O_8$: C, 79.62; H, 5.15; N, 3.77. Found: C, 79.12; H, 5.28; N, 3.64%.

The synthesis and purification procedures for (XV) were followed for (XVI), (XVII), and (XIX).

1-[2'-(3"β-5"-Cholestenyloxy)-ethoxy]-3,5-benzenedicarboxylic acid, bis [3-(4'-cyano-p-terphenyloxy)-1-propyl]ester, (XVI)

Yield 10%. Anal. Calcd. for $C_{81}H_{88}N_2O_8$: C, 79.90; H, 7.29; N, 2.30. Found: C, 79.71; H, 6.93; N, 2.48%. Proton NMR spectral data ($CDCl_3$), δ (ppm): 8.32–7.01 (m, 27H, Aromatic H), 5.37 (m, 1H, olefinic H on cholesteryl), 4.59 (t, 4H, $COOCH_2CH_2$), 4.20 (m, 6H, $CH_2CH_2CH_2O$, $OCH_2CH_2O$), 3.87 (2H, $OCH_2CH_2O$), 3.26 (1H, $OCH_2CH_2OCH$(on cholesteryl group)), 2.33(q, 4H, $CH_2CH_2CH_2$), 2.35–0.69 (m, 43H, other cholesteryl H). Anal. Calcd. for $C_{81}H_{88}N_2O_8$: C, 79.90; H, 7.29; N, 2.30. Found: C, 79.71; H, 6.93; N, 2.48%.

1-{2'-[4"(3'"β-5'"-Cholestenyloxycarboxy)phenoxy]-ethoxy}-3,5-benzenedicarboxylic acid, bis [3-(4'-cyano-p-terphenyloxy)-1-propyl]ester, (XVII)

Yield 33%. Proton NMR spectral data ($CDCl_3$), δ (ppm): 8.35–6.96 (m, 31H, aromatic H), 5.43 (m, 1H, olefinic H on cholesteryl moiety), 4.82 (1H, COOCH(on cholesteryl group)), 4.60 (t, 4H, COOCH$_2$CH$_2$), 4.42 (4H, OCH$_2$CH$_2$O), 4.20 (m, 4H, CH$_2$CH$_2$CH$_2$O), 2.33 (q, 4H, CH$_2$CH$_2$CH$_2$), 2.47–0.71 (m, 43H, other cholesteryl H). Anal. Calcd. for C$_{88}$H$_{92}$N$_2$O$_{10}$: C, 79.01; H, 6.93; N, 2.09. Found: C, 78.64; H, 6.75; N, 2.22%.

1-{(S)-(−)-2'-(4"-[4'"-(1""-Phenyl-ethylcarbamoyl) phenoxycarbonyl]phenoxy}ethoxy}-3,5-benzenedicarboxylic acid, bis [3-(4'-cyano-p-terphenyloxy)-1-propyl]ester, (XIX)

Yield 28%. Proton NMR spectral data (CDCl$_3$), δ (ppm): 8.36–6.35 (m, 40H, aromatic H), 6.35 (d, 1H, NH), 5.37 (q, 1H, C*H(CH3)), 4.61 (t, 4H, COOCH$_2$CH$_2$), 4.44 (s, 4H, OCH$_2$CH$_2$O), 4.20 (t, 4H, CH$_2$CH$_2$O), 2.31(q, 4H, CH$_2$CH$_2$CH$_2$), 1.64 (d, 3H, CHCH$_3$). Anal. Calcd. for C$_{76}$H$_{61}$N$_3$O$_{11}$: C, 76.56; H, 5.16; N, 3.53. Found: C, 76.09; H, 5.02; N, 3.64%.

1,3,5-Benzenetricarboxylic acid, tis{3,5-benzenedicarboxylic acid, bis[3-(4'-cyano-p-terphenyloxy)-1-propyl]ester}phenyl} ester, (XX)

A solution of 1,3,5-benzenetricarboxylic acid chloride (52.0 mg, 0.196 mmol), (w) (500 mg, 0.620 mmol) and DMAP (100 mg, 0.82 mmol) in 30 ml anhydrous DMF and 30 ml anhydrous THF was heated at 80° C. for 3 hours. The reaction mixture was then poured into 200 ml ethanol. The precipitate was dissolved in 50 ml methylene chloride and then washed with 10% NaHCO$_3$ (50 ml×2) and water (50 ml×2) consecutively before drying over anhydrous MgSO$_4$. Further purification was accomplished by silica gel column chromatography, with methylene chloride:acetone (100:1) as the eluent, to yield (XX) (40 mg, 8%). Proton NMR spectral data (CDCl$_3$), δ (ppm): 9.25–6.99 (m, 84H, aromatic H), 4.62 (t, 12H, COOCH$_2$CH$_2$), 4.19 (t, 12H, CH$_2$CH$_2$O), 2.32(q, 12H, CH$_2$CH$_2$CH$_2$). Anal. Calcd. for C$_{165}$H$_{120}$N$_6$O$_{24}$: C, 77.09; H, 4.71; N, 3.27. Found: C, 76.50; H, 4.64; N, 3.26%.

Molecular Structures, Thermotropic Properties, and Morphology

Chemical structures were elucidated with elemental analysis, FTIR (Nicolet 20 SXC) and proton NMR (Avance-400, Bruker, and QE-300, GE) spectroscopic techniques. Thermal transition temperatures were determined by DSC (Perkin-Elmer DSC-7) with a continuous N$_2$ purge at 20 mL/min. Samples were preheated to 350° C. followed by cooling at −20° C./min to −30° C. before taking the reported heating scans at 20° C./min. The reported values of T$_g$ and T$_c$ were reproducible to within ±1° C. Liquid crystal mesomorphism was characterized with a polarizing optical microscope (Leitz Orthoplan-Pol) equipped with a hot stage (FP82, Mettler) and a central processor (FP80, Mettler); the nematic and cholesteric mesomorphism were identified with the threaded textures and oily streaks, respectively. The morphology of pristine and thermally processed samples was analyzed with x-ray diffractometry (XRD). X-ray diffraction data were collected in reflection mode geometry using a Rigaku RU-300 Bragg-Brentano diffractometer equipped with a copper rotating anode, diffracted beam graphite monochromator tuned to CuKα radiation, and scintillation detector. Samples were analyzed in powder form (as received), and as films (powders heated above T$_c$ then cooled to 25° C. at a rate of −20° C./min). All XRD data collection was carried out at 25° C.

Measurements of Order Parameter and Selective Reflection on GLC Films

Optical elements for order parameter measurements were fabricated using optically flat, calcium fluoride substrates (1.00 in. diameter×0.04 in. thickness, Optovac) that are transparent in the infrared region. Optical elements for selective reflection measurements were fabricated using optically flat, fused silica substrates (1.00 in. diameter×⅛ in. thickness, Esco Products) that are transparent down to 200 nm. In both cases, the substrates were cleaned, spin-coated with Nylon 66, and then buffed with a velvet roller. Vitrified films were prepared by melting pristine powders between two surface-treated substrates at temperatures slightly above T$_c$ and thermally annealed at temperatures slightly below T$_c$ for 1 h before cooling at −30° C./h to room temperature. Thickness was controlled using glass fiber spacers for the 14 μm films and glass spheres for the 2 μm films. Order parameter was measured by linear dichroism using a FTIR spectrometer (Nicolet 20 SXC). Two measurements were performed with the transmission axis parallel and perpendicular to the nematic director (i.e. the buffing direction) of the sample. A UV-Vis-NIR spectrophotometer (Perkin-Elmer Lambda 9) was employed to measure light absorption (at normal incidence) and selective reflection (at 15° incidence from the surface normal) at room temperature. An aluminum mirror served as a specular reflection standard. The results were reported as % reflectivity of incident unpolarized light. In both the light absorption and the reflection measurements, Fresnel reflections from the two air-glass interfaces were accounted for using a reference cell comprising an index-matching fluid sandwiched between two surface-treated substrates.

Figure 1B:
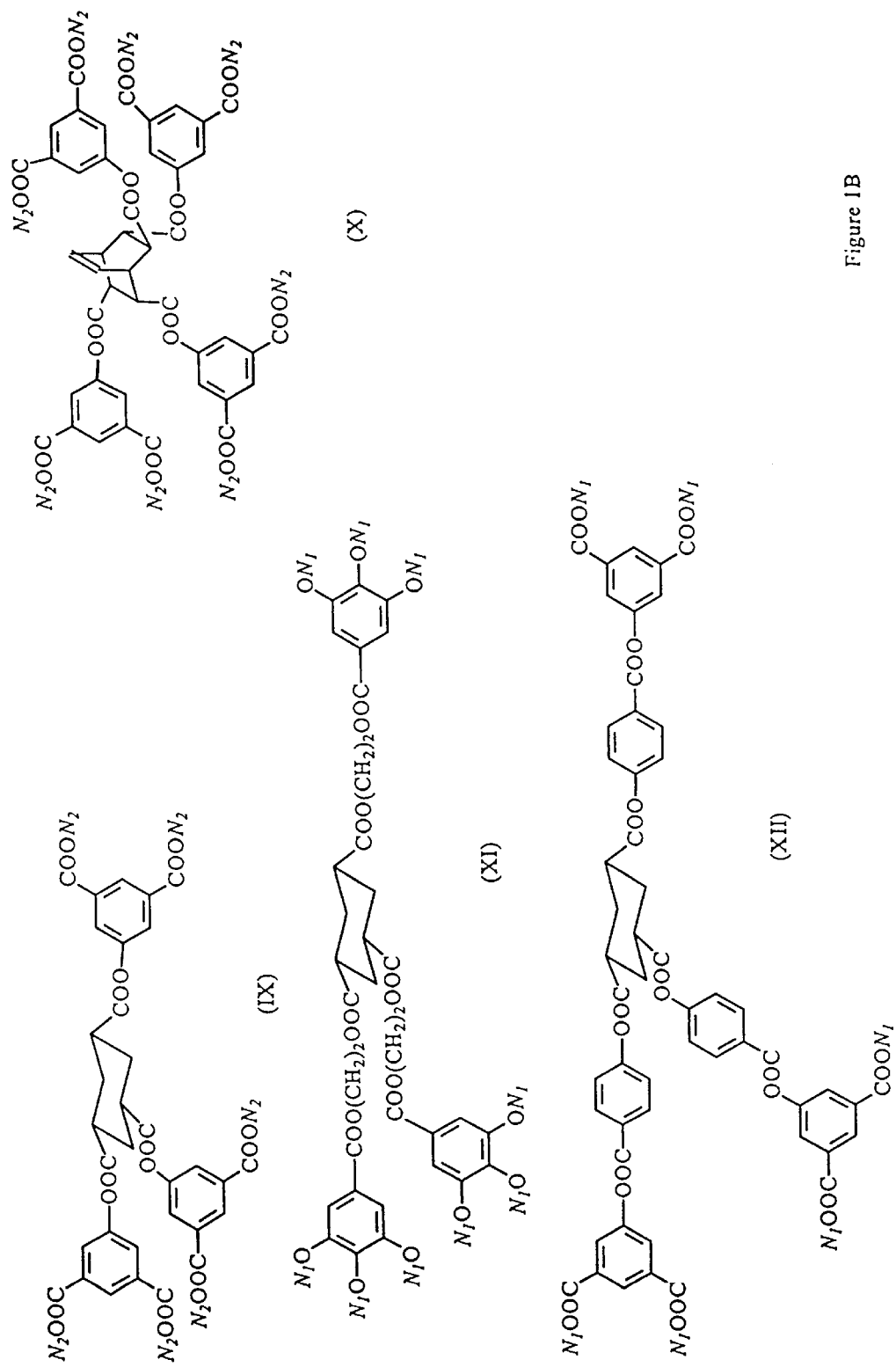
Figure 1C:
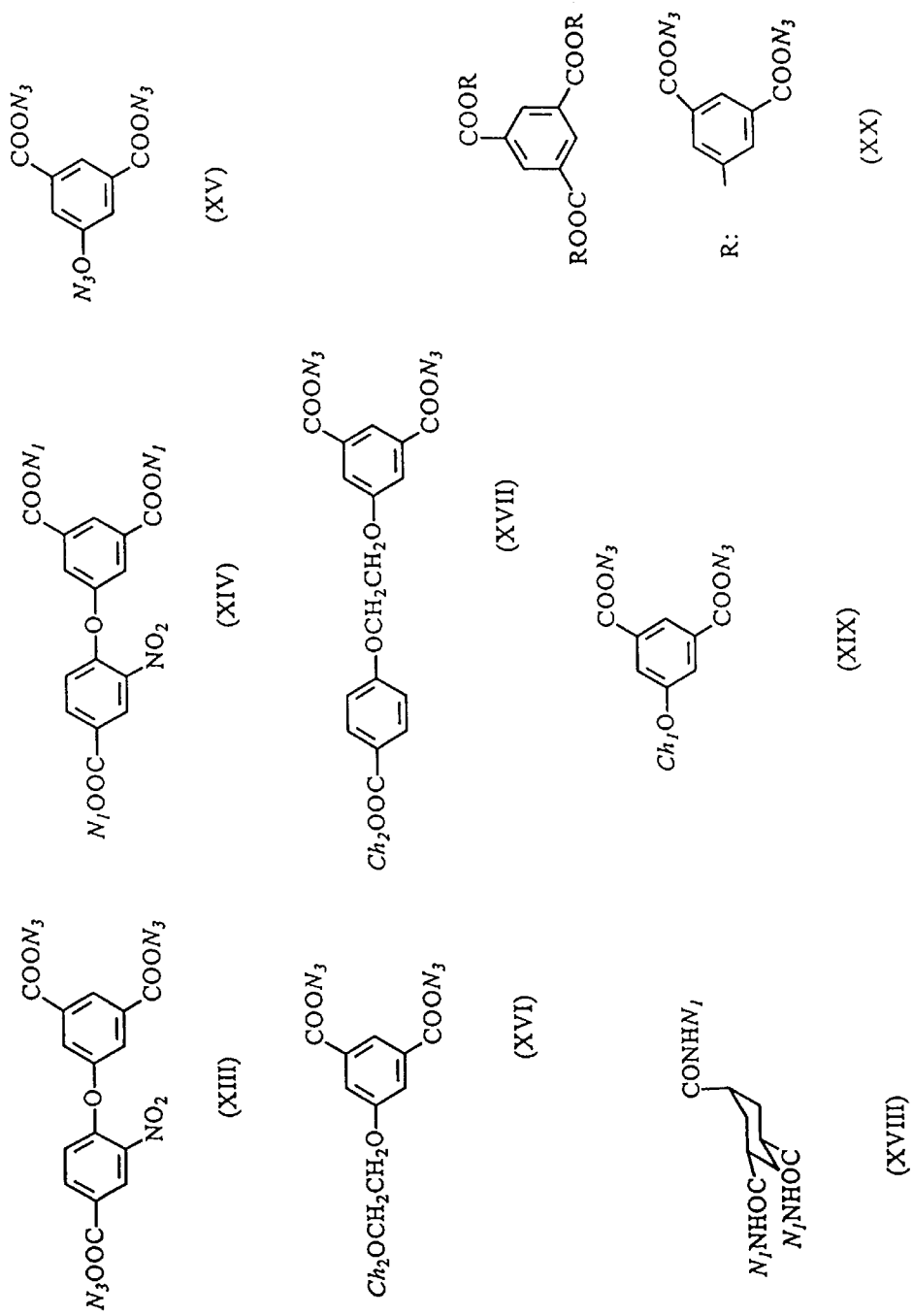

The molecular structures of the high T$_g$ GLCs depicted in FIGS. 1A–C were elucidated with elemental analysis and proton NMR spectral data in CDCl$_3$. Structure (I) of FIG. 1A is described in U.S. Pat. No. 5,514,296 and used herein for purposes of comparison to show improvement in the T$_g$ for the GLCs of the present invention. The equatorial configuration on the cis,cis-cyclohexane ring in (I) and (II) was determined on the basis of NMR signals in the region between δ 1.50 and 3.00. The exo,exo-configuration on the bicyclo[2.2.2]oct-7-ene ring in (III) and (IV) was validated with signals near δ 3.10 and 3.40 attributed to the tertiary (endo-) and bridgehead protons, respectively. Note the two triplets at δ 4.35 and 4.16, attributable to the trimethylene spacer in (I), emerge as a multiplet at δ 4.21 and a triplet at δ 4.04 in (III), presumably because of the hindered rotation by the N$_1$ pendants constrained on an exo,exo-bicyclooctene ring. The singlet at δ 3.11 attributable to the tertiary protons in (III) with an exo,exo-configuration is split into two multiplets at δ 3.02 (exo protons) and δ 3.28 (endo protons) with equal intensities in the exo,endo-configuration of (V). The signal attributable to the bridgehead proton was found to undergo a downfield shift to δ 3.57 in (V) from δ 3.39 in (III). It appears that the nematic pendants on the exo,endo-bicyclooctene ring in (V) are subject to hindered rotation, as in the exo,exo-configuration of (III). In addition, the endo- and exo-oriented, trimethylene spacer yielded distinct signals. Therefore, the two multiplets at δ 2.09 and 4.21 plus the triplet at δ 4.04 in (III) split into two sets of multiplets (2.05, 2.15) and (4.23, 4.35) plus one set of triplets (4.00, 4.07) in (V). In each set the higher field signal is attributed to the exo-configuration, and the lower to the endo-configuration in the exo,endo-bicyclooctene ring (cf. Shi and Chen, *Liquid Crystals*, 1995, 19, 849). The signals associated with the trimethylene spacer in (VI) are similar to those found in (V) except for the partial overlap of signals from the endo- and exo-configuration. In the case of benzene core, free rotation of both the N$_1$ and N$_2$ seems to prevail based on the NMR signals attributable to the trimethylene spacer in (VII) and (VIII), the two triplets near δ 4.70 and 4.26.

Figure 2:
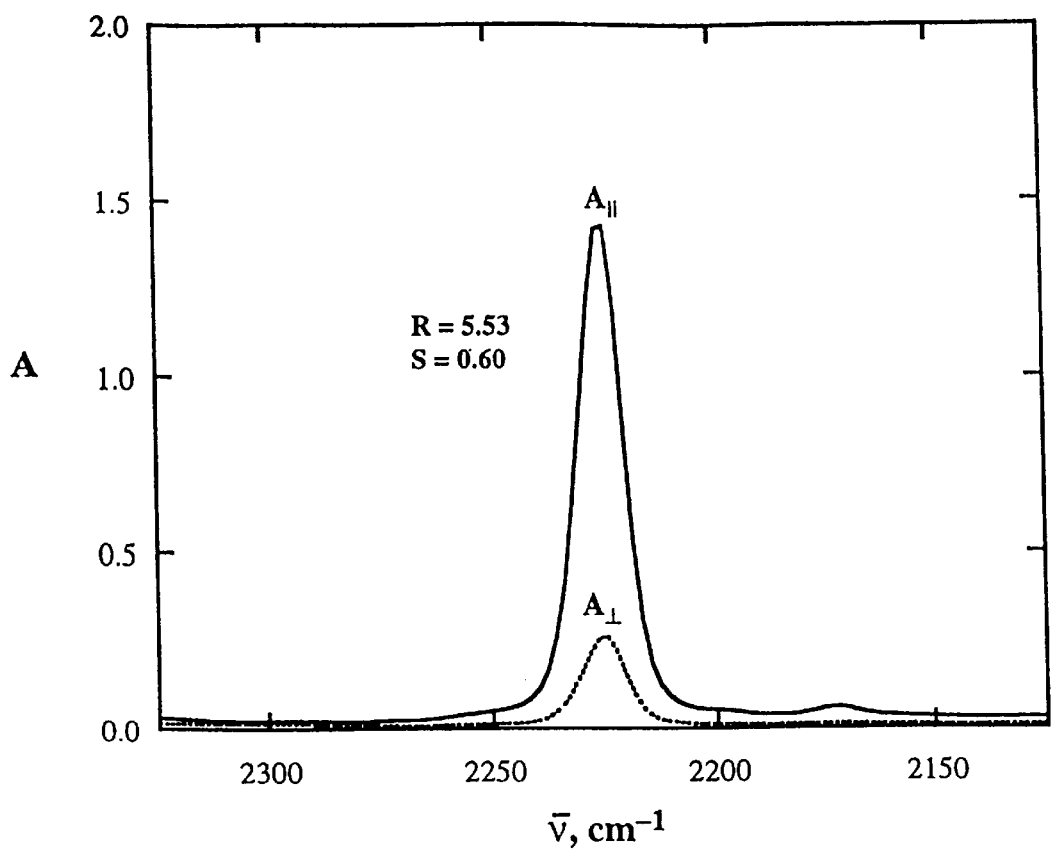
FIG. 2 is an FTIR spectrum measured for a nematic GLC film prepared from compound (VIII) of the present invention, which shows the linear dichroism of cyano bond stretching at 2225 cm$^{-1}$.

For a consistent evaluation of thermal transition temperatures by DSC, all pristine samples were heated beyond the clearing temperature, $T_c$, and then cooled at $-20°$ C./min to $-30°$ C. before taking a heating scan at 20° C./min. The resultant thermograms were used to determine $T_g$ and $T_c$ with the nematic and chiral-nematic (i.e. cholesteric) mesophase identified by threaded textures and oily streaks, respectively, under polarizing optical microscopy. The nematic GLCs, (I) through (VIII) except (IV), were further characterized by linear dichroism associated with the C≡N bond stretching at 2225 cm$^{-1}$, as shown in FIG. 2, where absorbances parallel ($A_{//}$) and perpendicular ($A_\perp$) to the nematic director are shown. With the dichroic ratio, $R=A_{//}/A_\perp$, the orientational order parameter can be determined, $S=(R-1)/(R+2)$, assuming that the absorption transition moment is parallel to the nematic director.

Figure 3:
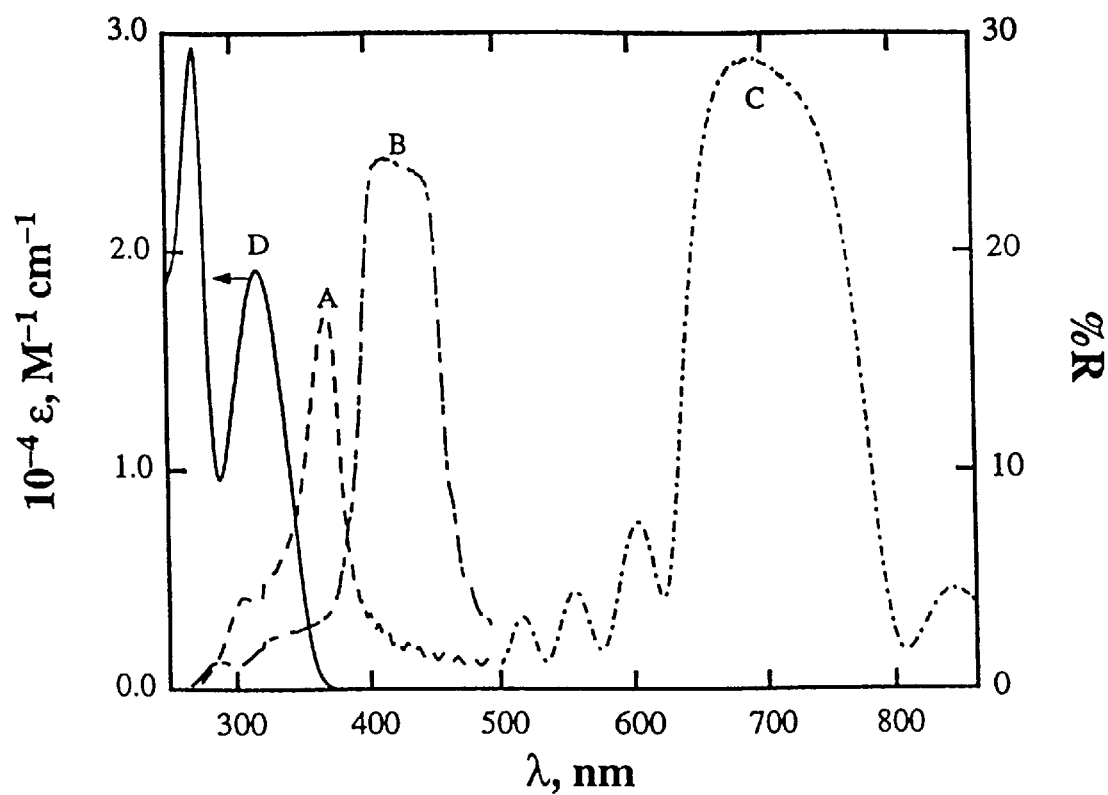
FIG. 3 is a spectrum showing the reflectivity measured with unpolarized light incident on GLC films containing varying ratios of prior art compounds (IV) and (III).
Figure 4:
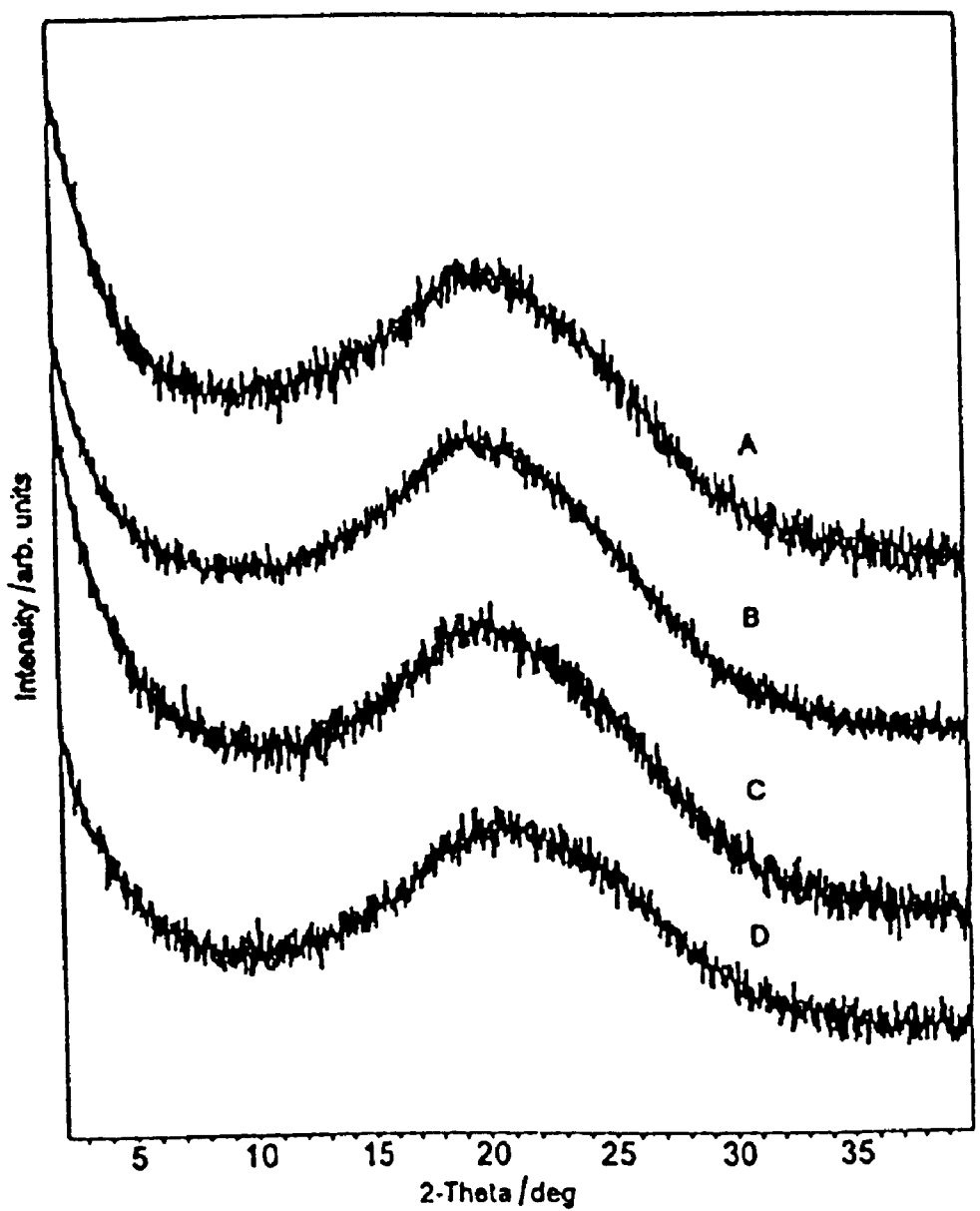
FIG. 4 depicts the X-ray diffraction patterns of compound (VII) of the present invention.
Figure 5:
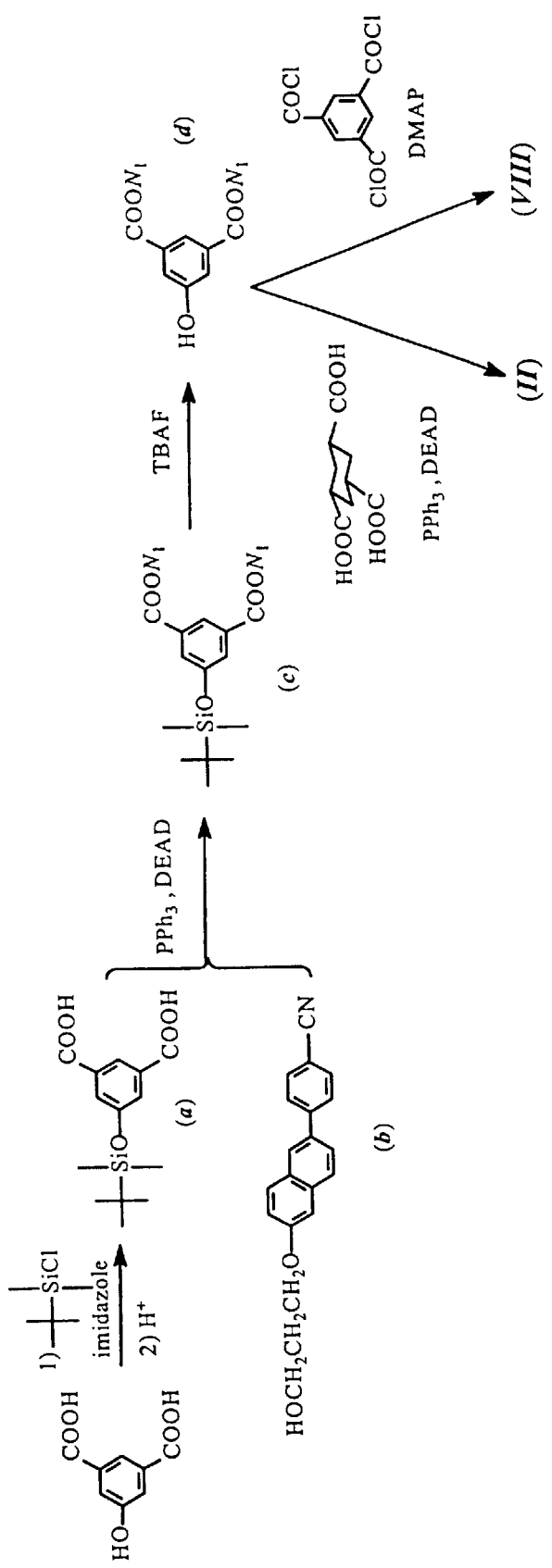
FIGS. 5–11 depict synthetic schemes for the preparation of the liquid crystalline compounds whose structures are shown in FIGS. 1A–1D.
Figure 6:
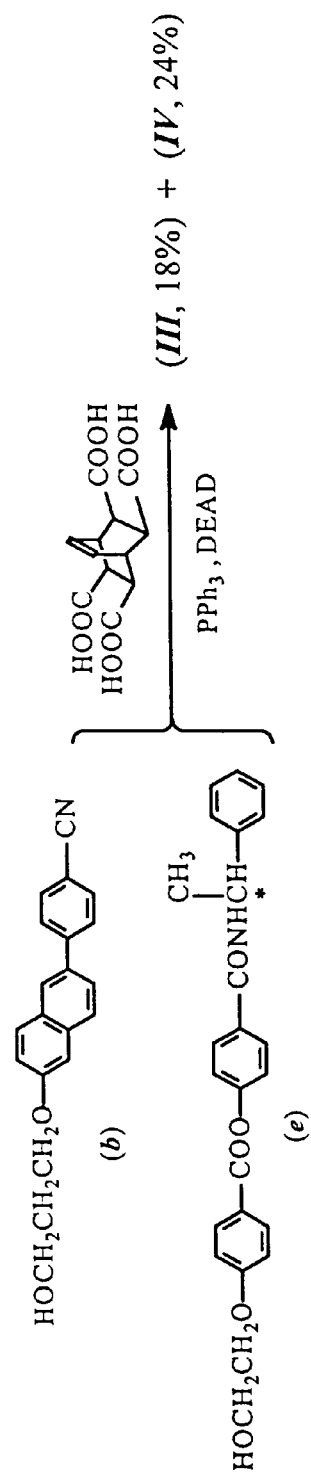
Figure 7:
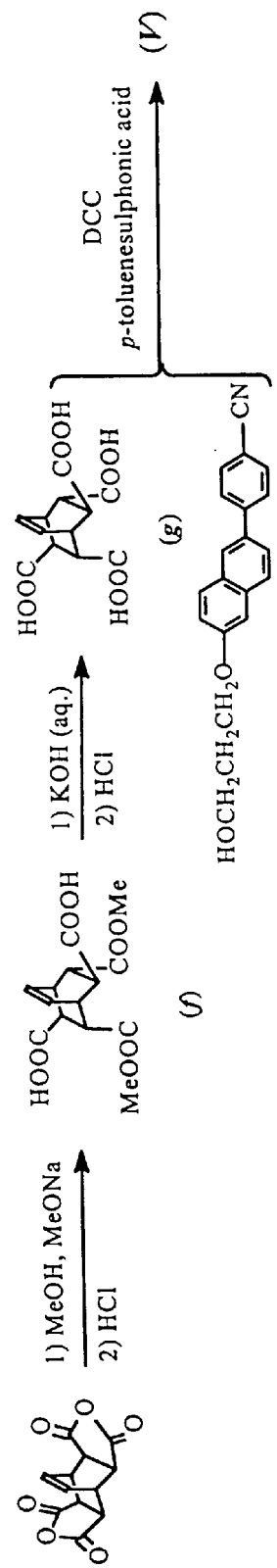
Figure 8:
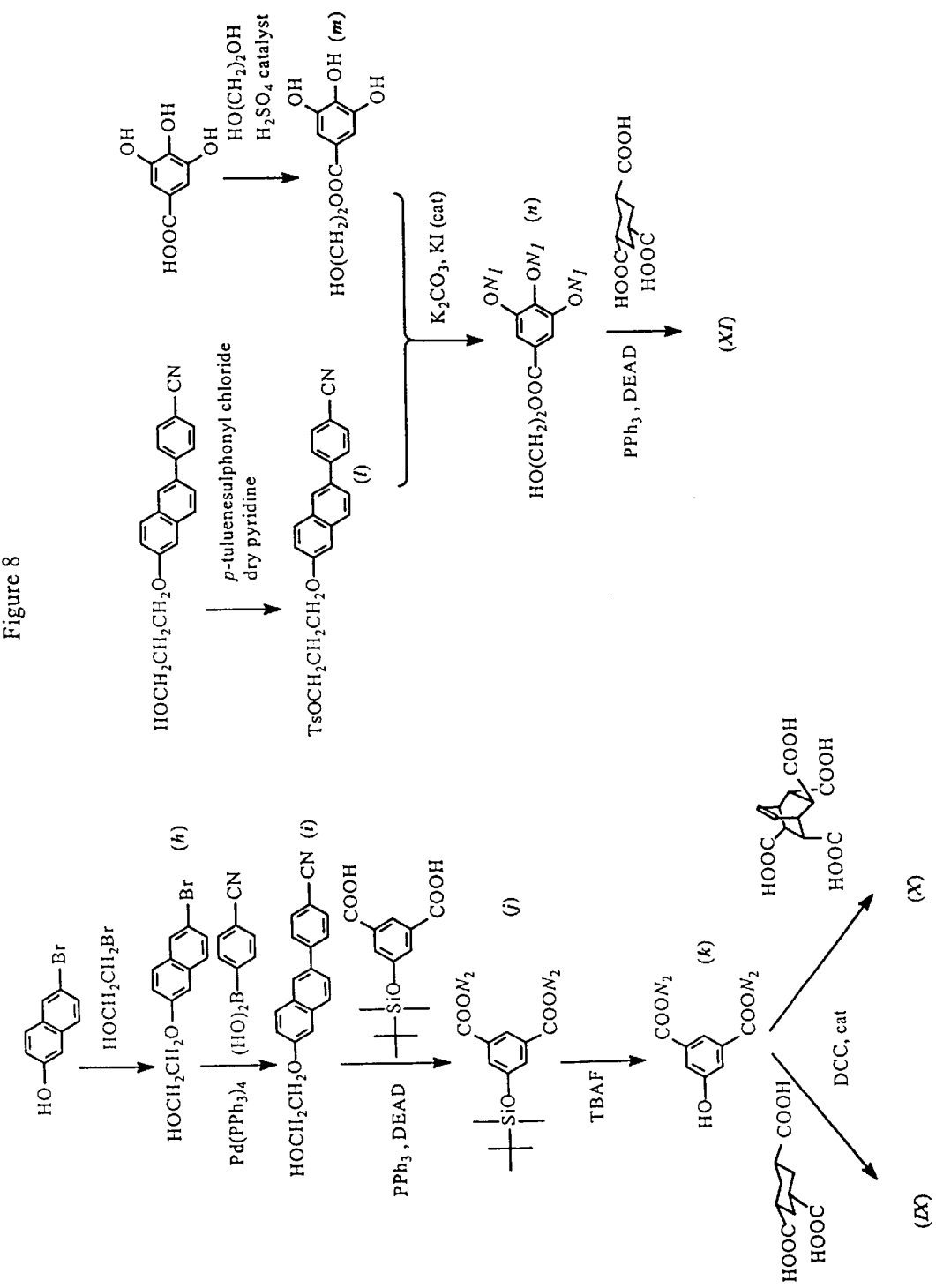
Figure 9:
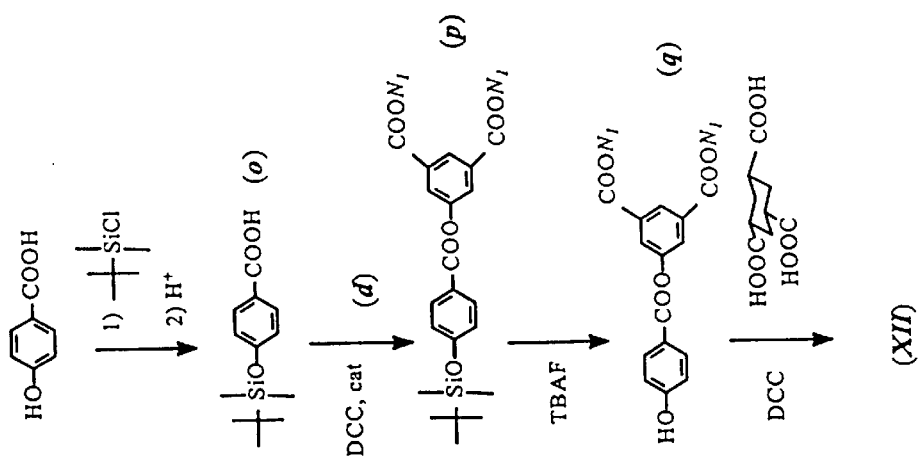
Figure 10:
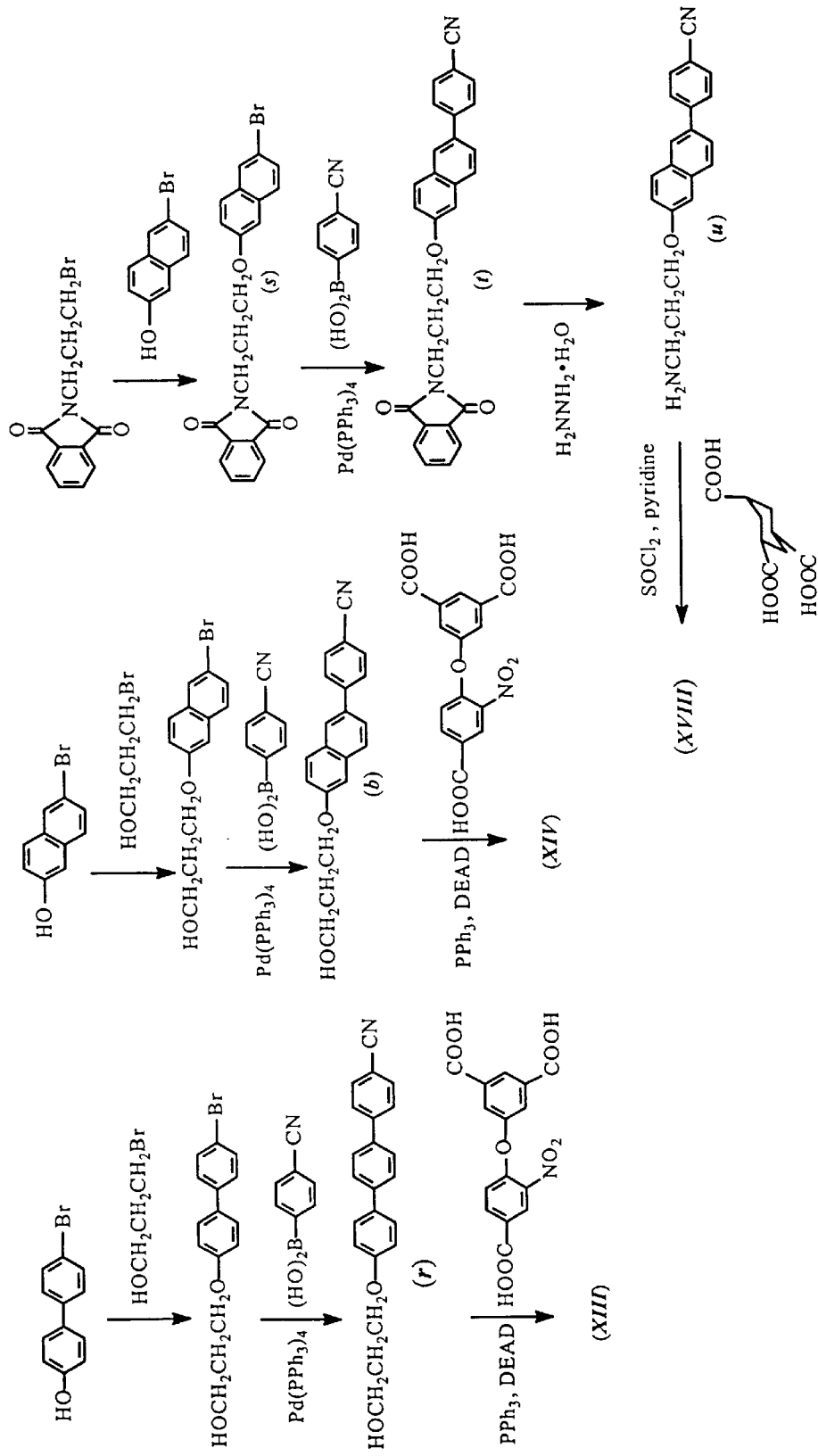
Figure 11:
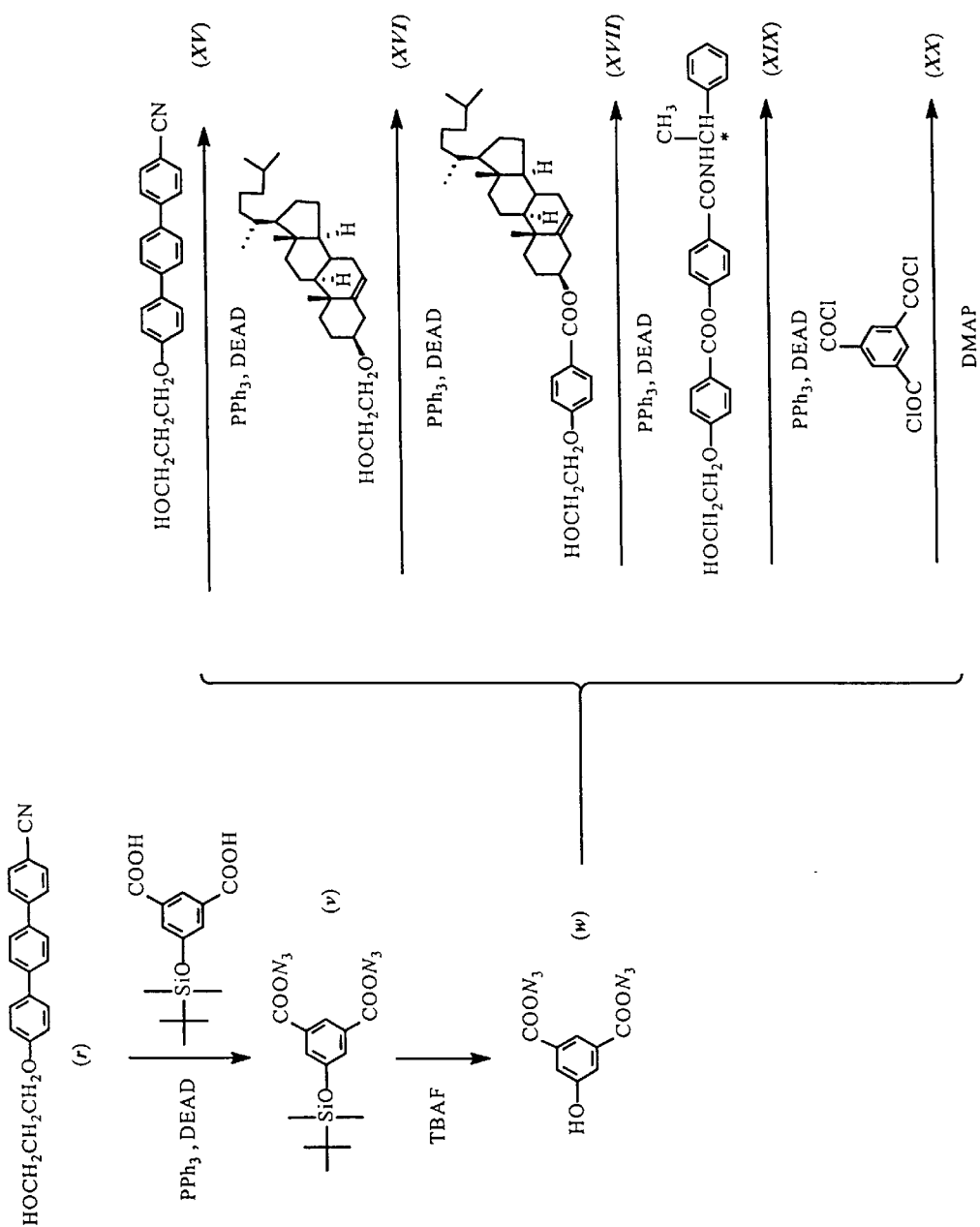

As a co-product from the statistical reaction conducted for Compound (III), (IV) was obtained as a chiral-nematic GLC with a $T_g$ of 93° C. and a $T_c$ of 127° C., representing an elevation in $T_g$ by 10 to 20° C. over all the chiral-nematics reported previously (cf. Katsis et al., *Chem. Mater.*, 1999, 11, 1590; Shi and Chen, *Liquid Crystals*, 1995, 19, 849. Specifically, there are 3 nematic and 1 chiral pendants in Compound (IV), as opposed to 2 nematic and 1 chiral pendants in the cyclohexane-based chiral-nematic GLCs. It is noted that replacing one of the nematic pendants in (III) with a nonmesogenic, chiral pendant produces a chiral-nematic GLC with a somewhat elevated $T_g$ but a much depressed $T_c$. Compound (IV) was melt-processed into a 2 $\mu$m thick GLC film, labeled as (A) in FIG. 3, yielding a selective reflection band around 375 nm. With an aluminum mirror serving as a specular reflector for incident unpolarized light, a perfect chiral-nematic film would yield a reflectivity of 50%. Since selective reflection appears in the UV-region, it is important to assess the extent to which light absorption distorts selective reflection. Since the chiral pendant absorbs light at a shorter wavelength than the nematic pendant, UV-absorption was measured for Compound (III) in methylene chloride at 10$^{-5}$ M. The result is presented as (D) in FIG. 3 in terms of extinction coefficient, indicating that part of the selective reflection band of the film prepared with (IV) is indeed lost to the absorption of incident light in the reflection measurement. The selective reflection spectra of 2 $\mu$m thick GLC films prepared with mixtures at molar ratios (IV):(III)=78:21 and 49:51 are presented as (B) and (C), respectively, in FIG. 3. As expected the selective reflection band undergoes a bathochromic shift at a decreasing chiral content. Film (B) was further used to demonstrate that (S)-(−)-1-phenylethylamine gives rise to a left-handed chiral-nematic film based on the handedness of reflected incident light (cf. Chen et al., *Polymer Preprints*, 1999, 40(2), 117). Finally, the morphology of pristine samples and that of thermally processed GLCs were characterized by x-ray diffractometry at room temperature. As illustrated in FIG. 4, the pristine powders of (VIII) are noncrystalline. Moreover, heating pristine samples to beyond $T_c$ with subsequent thermal annealing at temperatures slightly below $T_c$ for up to 1 h before cooling to room temperature produced nematic GLCs that remain noncrystalline when left at room temperature for 6 months as illustrated with Compound (VIII) in FIG. 4.

The Glass-forming Liquid Crystals (GLCs) with elevated $T_g$ were implemented by increasing the volume of the nonmesogenic central core with an attendant increase in the number of mesogenic pendants per GLC molecule, the new GLCs possessing a $T_g$ above 100° C. with the following key observations:

(i) An extended central core accompanied by an increased number of nematic pendants over the benzene, cis,cis-cyclohexane, and exo,endo-bicyclo[2.2.2]oct-7-ene base structures was found to elevate $T_g$ by 30 to 40° C. without a definite trend in $T_c$.

(ii) The exo,endo-bicyclo[2.2.2]oct-7-ene central core was prepared via modification of the exo,exo-configuration with its stereochemistry validated by proton-NMR spectroscopy. With the same nematic pendant, the exo,exo-GLC showed an elevation in $T_g$ by 13° C. and in $T_c$ by 49° C. over the exo,endo-counterpart.

(iii) A left-handed chiral-nematic GLC emerged from (S)-(−)-1-phenylethylamine as the chiral moiety. Selective reflection bands ranging from the UV- to the visible spectral region were demonstrated with GLC films at a decreasing chiral content.

(iv) Heating pristine samples to beyond $T_c$ followed by thermal annealing at temperatures slightly below $T_c$ and then cooling to room temperature produced well-aligned nematic GLC films as quantified by orientational order parameter measured with FTIR linear dichroism.

(v) The x-ray diffraction patterns revealed the noncrystalline morphology of all pristine samples. Thermally processed GLC samples were found to remain noncrystalline when left at room temperature for 6 months.

TABLE 1

Thermotropic properties of glass-forming liquid crystals[†,‡]

| GLC | Phase Transition Temperatures |
|---|---|
| I | G 68° C. N195° C. I |
| II | G 108° C. N 197° C. I |
| III | G 84° C. N 222° C. I |
| IV | G 93° C. Ch 127° C. I |
| V | G 71° C. N 173° C. I |
| VI | G 102° C. 187° C. I |
| VII | G 75° C. N 235° C. I |
| VIII | G 106° C. N 183° C. I |
| IX | G 123° C. N 154° C. I |
| X | G 120° C. N 143° C. I |
| XI | G 93° C. N 182° C. I |
| XII | G 111° C. N 184° C. I |
| XIII | G 86° C. N 288° C. I |
| XIV | G 76° C. N 153° C. I |
| XV | G 82° C. N 347° C. I |
| XVI | G 63° C. Ch 256° C. I |
| XVII | G 73° C. Ch 309° C. I |
| XVIII | G 101° C. N 197° C. I |
| XIX | G 83° C., 142° C. $K_1$ 172° C., 175° C. $K_2$ 189° C. Ch 223° C. I[§] I 219° C. Ch 77° C. G (from cooling scan) |
| XX | G 127° C. N 308° C. I |

[†]Symbols: G, glassy; N, nematic; Ch, cholesteric; K, crystalline. I, isotropic.
[‡]Phase transition temperatures determined with heating scans at 20° C./min gathered with a differential scanning calorimeter (DSC-7, Perkin-Elmer). The samples were pretreated by heating to beyond their clearing points followed by cooling at −20° C./min.
[§]Compound (XIX) showed crystallization upon heating, but was found to undergo glass transition upon cooling at −20° C./min without encountering crystallization. In fact, none of the compounds listed above showed crystallization upon cooling, indicating feasibility of preparing glassy liquid crystalline films via melt processing into optical devices.

What is claimed is:

1. A glass-forming liquid crystal composition comprising a compound having a molecular weight of about 1000 to 5000 grams per mole, and having the formula

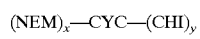

$(NEM)_x$—CYC—$(CHI)_y$ wherein CYC is a substituted cycloaliphatic core moiety that contains about 24 to about 60 carbon atoms that further includes at least one 5-oxyisophthalate linking moiety, NEM is a nematogenic pendant moiety, CHI is a chiral pendant moiety, x is 2 to 8, and y is 0 to 4.

2. The liquid crystal composition of claim 1 wherein CYC includes at least three 5-oxyisophthalate linking moieties.

3. The liquid crystal composition of claim 1 wherein x is at least 6.

4. The liquid crystal composition of claim 1 wherein y is at least 1.

5. The liquid crystal composition of claim 1 wherein said compound is selected from the group represented by structures (II), (VI), (IX), (X), and (XII) in FIGS. 1A–1B.

6. The liquid crystal composition of claim 1 wherein the cycloaliphatic core moiety comprises a radical derived by removal of hydrogen from adamantane, bicyclooctene, cyclohexane, or cubane.

Figure 1D:
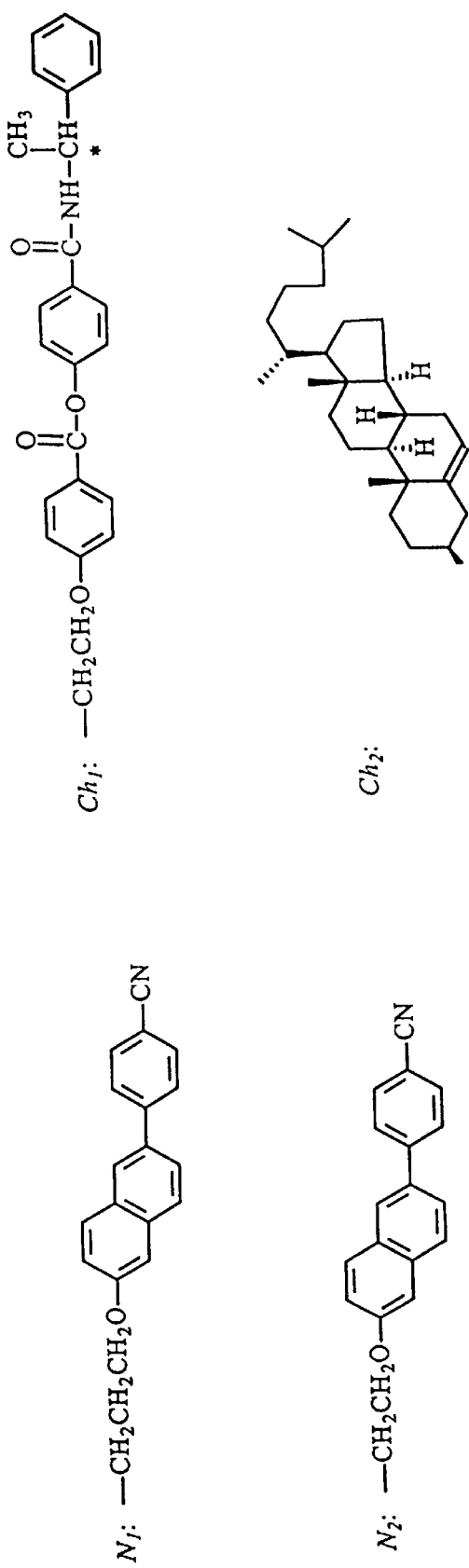

7. The liquid crystal composition of claim 1 wherein NEM is selected from the group represented by structures $N_1$, $N_2$, and $N_3$ in FIG. 1D.

8. The liquid crystal composition of claim 1 wherein CHI is selected from the group represented by structures $Ch_1$ and $Ch_2$ in FIG. 1D.

9. The liquid crystal composition of claim 1 exhibiting nematic, smectic, and cholesteric mesophases with a $T_g$ between about 60° C. and about 130° C.

10. The liquid crystal composition of claim 1 exhibiting a clearing temperature beyond about 350° C.

11. An optical device formed from a glass-forming liquid crystal composition comprising a compound having a molecular weight of about 1000 to 5000 grams per mole, and having the formula

wherein CYC is a substituted cycloaliphatic core moiety that contains about 24 to about 60 carbon atoms and further includes at least one 5-oxyisophthalate linking moiety, NEM is a nematogenic pendant moiety, CHI is a chiral pendant moiety, x is 2 to 8, and y is 0 to 4.

12. The optical device of claim 11 wherein CYC includes at least three 5-oxyisophthalate linking moieties.

13. The optical device of claim 11 wherein x is at least 6.

14. The optical device of claim 11 wherein y is at least 1.

15. The optical device of claim 11 wherein said compound is selected from the group represented by structures (II), (VI), (IX), (X), and (XII) in FIGS. 1A–1B.

16. The liquid crystal composition of claim 11 wherein the cycloaliphatic core moiety comprises a radical derived by removal of hydrogen from adamantane, bicyclooctene, cyclohexane, or cubane.

17. The optical device of claim 11 wherein NEM is selected from the group represented by structures $N_1$, $N_2$, and $N_3$ in FIG. 1D.

18. The optical device of claim 11 wherein CHI is selected from the group represented by structures $Ch_1$ and $Ch_2$ in FIG. 1D.

* * * * *